US 11,429,956 B2

(12) United States Patent
Bartolucci et al.

(10) Patent No.: US 11,429,956 B2
(45) Date of Patent: Aug. 30, 2022

(54) COMPUTER-IMPLEMENTED SYSTEMS AND METHODS FOR AUTHORISING BLOCKCHAIN TRANSACTIONS WITH LOW-ENTROPY PASSWORDS

(71) Applicant: nChain Holdings Limited, St. John's (AG)

(72) Inventors: Silvia Bartolucci, London (GB); John Fletcher, Cambridge (GB)

(73) Assignee: nChain Holdings Limited, St. John's (AG)

( * ) Notice: Subject to any disclaimer, the term of this patent is extended or adjusted under 35 U.S.C. 154(b) by 152 days.

(21) Appl. No.: 16/954,173

(22) PCT Filed: Dec. 12, 2018

(86) PCT No.: PCT/IB2018/059921
§ 371 (c)(1),
(2) Date: Jun. 15, 2020

(87) PCT Pub. No.: WO2019/116249
PCT Pub. Date: Jun. 20, 2019

(65) Prior Publication Data
US 2021/0158342 A1 May 27, 2021

(30) Foreign Application Priority Data
Dec. 15, 2017 (GB) .................................. 1721049

(51) Int. Cl.
*G06Q 20/38* (2012.01)
*H04L 9/06* (2006.01)
(Continued)

(52) U.S. Cl.
CPC ..... *G06Q 20/3821* (2013.01); *G06Q 20/3823* (2013.01); *G06Q 20/3825* (2013.01);
(Continued)

(58) Field of Classification Search
None
See application file for complete search history.

(56) References Cited

U.S. PATENT DOCUMENTS 9,240,884 B2 * 1/2016 Brown .................. H04L 9/0861
9,800,411 B1 * 10/2017 Brown .................. H04L 9/3066
(Continued)

FOREIGN PATENT DOCUMENTS

CN 107465505 A 12/2017
CN 107623569 A 1/2018
(Continued)

OTHER PUBLICATIONS

Singh et al., "Efficient weighted threshold ECDSA for securing bitcoin wallet," 2017 ISEA Asia Security and Privacy (ISEASP), 2017, pp. 1-9, doi: 10.1109/ISEASP.2017.7976994. (Year: 2017).*
(Continued)

*Primary Examiner* — Jacob C. Coppola
(74) *Attorney, Agent, or Firm* — Davis Wright Tremaine LLP

(57) ABSTRACT

There may be provided a blockchain-implemented security method involving a requestor and a group of nodes, which includes generating a cryptographic key of the requestor based on a password chosen by the requestor and first quantities sent by the group of nodes (which are derived from private key shares of the group of nodes and a generator function of a digital signature scheme employing a bilinear mapping on an elliptic curve). A cryptographic signature for a requestor blockchain transaction can be generated where the signature corresponds to the requestor's cryptographic key. The signature can be based on the password and second quantities sent by the group of nodes (which are also derived from the group private key shares). The method can further include verifying the cryptographic signature of the blockchain transaction using the requestor's
(Continued)

cryptographic key. Additionally or alternatively, the method can employ a consensus mechanism involving the group of nodes to allow the requestor to authorise a transaction with a password. The method can be logically partitioned into a sequence of phases, including an initialisation phase, a funding phase, and a payment authorization phase (which involves a pre-spending transaction and a spending transaction).

20 Claims, 16 Drawing Sheets

(51) Int. Cl.
*H04L 9/08* (2006.01)
*H04L 9/30* (2006.01)
*H04L 9/32* (2006.01)

(52) U.S. Cl.
CPC ....... *G06Q 20/3829* (2013.01); *H04L 9/0643* (2013.01); *H04L 9/085* (2013.01); *H04L 9/0863* (2013.01); *H04L 9/3066* (2013.01); *H04L 9/3247* (2013.01); *G06Q 2220/00* (2013.01); *H04L 2209/56* (2013.01)

(56) References Cited

U.S. PATENT DOCUMENTS

| | | | |
|---|---|---|---|
| 10,681,038 | B1* | 6/2020 | Lambert ............... H04L 9/0866 |
| 2005/0022102 | A1 | 1/2005 | Gentry |
| 2006/0153364 | A1 | 7/2006 | Beeson |
| 2017/0180134 | A1* | 6/2017 | King ..................... H04L 9/3239 |
| 2017/0185998 | A1 | 6/2017 | Jung |
| 2017/0223008 | A1 | 8/2017 | Camenisch et al. |
| 2017/0352031 | A1 | 12/2017 | Collin |

FOREIGN PATENT DOCUMENTS

| | | | | |
|---|---|---|---|---|
| KR | 100718687 | B1 | 5/2007 | |
| WO | WO-2015160839 | A1 * | 10/2015 | ............. H04L 9/085 |
| WO | 2016008659 | A1 | 1/2016 | |
| WO | 2017001972 | A1 | 1/2017 | |
| WO | 2017147696 | A1 | 9/2017 | |
| WO | WO-2019116249 | A1 * | 6/2019 | ............. H04L 9/085 |

OTHER PUBLICATIONS

McCorry, Patrick & Möser, Malte & Shahandashti, Siamak & Hao, Feng. (2016). Towards Bitcoin Payment Networks. 9722. 57-76. 10.1007/978-3-319-40253-6_4. (Year: 2016).*
Kokoris-Kogias, Eleftherios & Jovanovic, Philipp & Gailly, Nicolas & Khoffi, Ismail & Gasser, Linus & Ford, Bryan. (2016). Enhancing Bitcoin Security and Performance with Strong Consistency via Collective Signing. (Year: 2016).*
Syta Ewa et al., Keeping authorities honest or bust with decentralized witness cosigning, 2016 IEEE Symposium on Security and Privacy, IEEE, May 22, 2016, pp. 526-545, XP032945718, DOI: 10.1109/SP.2016.38. (Year: 2016).*
Y. Liu et al., "An efficient method to enhance Bitcoin wallet security," 2017 11th IEEE International Conference on Anti-counterfeiting, Security, and Identification (ASID), 2017, pp. 26-29, doi: 10.1109/ICASID.2017.8285737. (Year: 2017).*
D. Harkins, Dragonfly Key Exchange (RFC7664), Internet Research Task Force (IRTF), Request for Comments: 7664, all pages. (Year: 2015).*
"Unapproved IEEE Draft Standard for Specifications for Password Based Public Key Cryptographic Techniques," in IEEE Unapproved Std P1363.2 /D27, Feb. 2007 , vol. No. 2007. (Year: 2007).*
Boldyreva, Threshold Signatures, Multisignatures and Blind Signatures Based on the Gap-Diffie-Hellman-Group Signature Scheme, Dept. of Computer Science & Engineering, University of California at San Diego, all pages. (Year: 2003).*
Antonopoulos, "Mastering Bitcoin—Unlocking Digital Cryptocurrencies," O'Reilly Media, Inc., Dec. 20, 2014, 282 pages.
Bagherzandi et al., "Password-Protected Secret Sharing," retrieved from https://eprint.iacr.org/2010/561.pdf, Nov. 5, 2010, 22 pages.
Garzik, "[Bitcoin-development] Presenting a BIP for Shamir's Secret Sharing of Bitcoin private keys," Linux Foundation, https://lists.linuxfoundation.org/pipermail/bitcoin-dev/2014-March/004902.html, Mar. 29, 2014, 2 pages.
Hearn, "[ANN] PassGuardian.com—Client-side Threshold Secret Sharing," retrieved from https://bitcointalk.org/index.php?topic=142875.0, Sep. 15, 2017, 4 pages.
Ibrahim et al., "A robust threshold elliptic curve digital signature providing a new verifiable secret sharing scheme," 2003 IEEE 46th Midwest Symposium on Circuits and Systems 1:276-280, Dec. 30, 2003, 6 pages.
International Search Report and Written Opinion dated Mar. 19, 2019, Patent Application No. PCT/IB2018/059921, 14 pages.
Jarecki et al., "Highly-Efficient and Composable Password-Protected Secret Sharing (Or: How to Protect Your Bitcoin Wallet Online)," IEEE European Symposium on Security and Privacy (EuroS&P), Mar. 21, 2016, https://eprint.iacr.org/2016/144.pdf, 16 pages.
Jarecki et al., "Round-Optimal Password-Protected Secret Sharing and T-PAKE in the Password-Only model," International Conference on the Theory and Application of Cryptology and Information Security, Dec. 7, 2014, https://eprint.iacr.org/2014/650.pdf, 44 pages.
Kokoris-Kogias et al., "Enhancing bitcoin security and performance with strong consistency via collective signing," 25th Usenix Security Symposium 2016, Aug. 10, 2016, 19 pages.
Madmat et al., "Best way to use Shamir's Secret Sharing Scheme," Bitcoin Forum, Apr. 11, 2014, https://bitcointalk.org/index.php?topic=566298.5, 2 pages.
Nakamoto, "Bitcoin: A Peer-to-Peer Electronic Cash System," Bitcoin, Oct. 31, 2008, https://bitcoin.org/bitcoin.pdf, 9 pages.
Satoshi et al., "Connection Limits," Bitcoin Forum, Aug. 9, 2010, https://bitcointalk.org/index.php?topic=741.0 prev_next=prev, 2 pages.
Singh et al., "Efficient Weighted Threshold ECDSA for Securing Bitcoin Wallet," 2017 ISEA Asia Security and Privacy (ISEASP), http://ieeexploreieee.org/document/7976994/, Jan. 29, 2017, 10 pages.
Stathakopoulou et al., "Threshold Signatures for Blockchain Systems," IBM Research Report, Apr. 4, 2017, 42 pages.
UK Commercial Search Report dated May 4, 2018, Patent Application No. GB1721049.3, 10 pages.
Uk IPO Search Report dated Jun. 11, 2018, Patent Application No. GB1721049.3, 3 pages.

* cited by examiner

COMPUTER-IMPLEMENTED SYSTEMS AND METHODS FOR AUTHORISING BLOCKCHAIN TRANSACTIONS WITH LOW-ENTROPY PASSWORDS

This invention relates generally to distributed systems, and more particularly to methods and systems for improving the security, reliability and usability of cryptographically-enforced assets (including cryptographic currency such as Bitcoin) maintained on a blockchain.

In this document, we use the term 'blockchain' to include all forms of electronic, computer-based, distributed ledgers. These include, but are not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "bitcoin" is used herein to refer to any and all protocol deriving from the Bitcoin protocol.

A blockchain is a consensus-based, electronic ledger which is implemented as a computer-based decentralised, distributed system made up of blocks which in turn are made up of transactions and other information. In the case of Bitcoin, each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Some network nodes act as miners and perform work to ensure that each transaction is valid, with invalid transactions rejected from the network. For example, software clients installed on the nodes perform this validation work on transactions that reference unspent transaction outputs (UTXO). Validation may be performed by executing its locking and unlocking scripts. If execution of the locking and unlocking scripts evaluate to TRUE and, if certain other conditions are met (such as inclusion of a sufficient mining fee), the transaction is valid and the transaction may be written to the blockchain. Thus, in order for a transaction to be written to the blockchain, it must be i) validated by a node that receives the transaction—if the transaction is validated, the node relays it to the other nodes in the network; and ii) added to a new block built by a miner; and iii) mined, i.e. added to the public ledger of past transactions. The transaction is considered to be confirmed when a sufficient number of blocks are added to the blockchain to make the transaction practically irreversible.

Private keys are commonly used to control access to cryptographically secured assets maintained on a blockchain, such as spending cryptographic currency maintained on the blockchain. More specifically, a user is typically given a public address and a private key to send and receive cryptographic coins or tokens for other cryptographic assets that belong to the user. The private key is a secret number that allows the cryptographic coins or other cryptographic assets that belong to the user to be spent, withdrawn or otherwise transferred or encumbered. In Bitcoin, a private key is usually a 256-bit number. The public address is where the cryptographic assets of the user are deposited and received. The public key is created from the private key through a mathematical algorithm. However, it is practically impossible to invert the process by generating a private key from a public key.

Typically, a digital wallet is used to store the private key of a user. When a transaction is initiated by the user for spending, withdrawing, or otherwise transferring or encumbering cryptographic assets that belong to the user, the digital wallet creates a digital signature by processing the transaction with the private key. This upholds a secure system since the only way to generate a valid signature for any given transaction is to use the private key such that the signature for the transaction validates against the public address corresponding to the private key. The signature and the public address is used to verify that the transaction has come from the user (who is the holder of the private key corresponding to the public address), and ensures that elements of the transaction which are critical to security (such as the amount sent, the recipient address) cannot be changed once broadcasted. If these transaction elements get altered, the verification of the transaction based on the signature and public address of the user will fail.

If a user loses his/her private key, the user can no longer spend, withdraw, or otherwise transfer or encumber the cryptographic assets of the user that are associated with the private key. It is therefore, imperative to save the private key in a secure location. There are a number of ways that a digital wallet can store the private key of a user.

In one example, a private key can be printed on a paper-form or electronic document so that it can be retrieved when a transaction needs to be signed with the private key of the user. For example, the private key can possibly be printed in the form of a QR code that can be scanned when a transaction needs to be signed with the private key of the user. The private key can also be stored using cold-storage or a hardware wallet, which typically uses a smartcard or USB device that securely stores the private key of a user and signs transactions offline using the private key of the user. In another example, the private key can be stored using a hot wallet, which typically stores the private key and signs transactions using systems that are online and connected in some way to the Internet.

Recovery of cryptographic assets when a private key is lost is a famous unsolved problem in cryptographic currencies. The lack of a decentralised mechanism by which this can be achieved is generally recognized to be one of the most significant barriers to widespread adoption of cryptographic currencies. For example, it has been estimated that more than 2700 Bitcoin have been effectively lost due to hard drive crashes or private keys loss. Once the private keys are lost, the Bitcoin, which may be worth billions of dollars, are locked in unusable wallets.

Indeed, losing a private key may seem superficially similar to the loss of an online banking password. However, there are at least two important differences. First, banking system transactions are traceable and reversible and stolen funds can potentially be recovered by reversing fraudulent transactions. This is clearly not possible with cryptocurrency, such as Bitcoin, as transactions are irreversible and there is no central authority to arbitrate in the event of fraud. Second, banking passwords can be recovered or reissued in return for the user proving their identity to the bank. In contrast, password recovery services such as https://walletrecoveryservices.com/, are available for some cryptocurrency wallets.

However, these password recovery services have, in general, a low success rate, (typically around 30% and depends on the information provided by the user), and the fee charged for such password recovery services is generally quite high (i.e., the fee can be up to 20% of the value of the wallet in the case of successful password recovery).

Another proposed solution for the recovery of cryptographic assets when a private key is lost is referred to as a brainwallet, whereby a private key is generated by hashing a sufficiently long password or passphrase directly created by the user. This solution tries to solve the key storage issue, as the password does not need to be stored in the wallet itself but it can be kept in the 'user's brain'. Online platforms, such as https://brainwallet.io/, https://paper.dash.org/ etc., can easily generate a deterministic cryptocurrency private key given a password/passphrase and some salt, i.e. random data that is used as an additional input to the hashing one-way function. Note that the brainwallet password/passphrase must be secure and memorable at the same time. In this case, the security is based on the time needed by an attacker to crack the password/passphrase while memorability relies on the amount of information that must be remembered. Clearly, the two aspects are negatively correlated, and depend on the entropy of the chosen password.

One problem of the brainwallet is the high incentive to try to crack the password/passphrase and salt used to generate the private key as this would give the attacker full access to the cryptographic assets locked in the wallet itself. Attackers can use brute force cracking algorithms that try many different passwords/passphrases and salts and check if the generated private key exists and is associated with cryptographic assets. With current technology, chips can perform around $2^{36}$ attempts per second. Furthermore, a real-world attack has shown that brainwallets are not secure even if complex passwords are employed and new and faster algorithms. Specifically, the real-world attack managed to find 16,250 passwords per second on each thread and cracked more than 18,000 brainwallet addresses. Moreover, recently millions of real-world leaked passwords have been made available to hackers who can use such passwords to reconstruct users' habits and design faster algorithms to crack the password/passphrase and salt used to generate the brainwallet private key. A possible further weakness may occur when brainwallet addresses, derived from the same password, are stored on the blockchain as part of the transaction script. Guessing passwords when multiple addresses are derived from the same seed, then, becomes easier.

Key stretching techniques can be used to make it more difficult to crack brainwallet addresses. Such key stretching techniques use a difficult-to-optimise hash function (such as SHA256, SHA1) multiple times to derive a private key from a simple password. Such techniques help to make the attack more computationally expensive but does not guarantee security into the future. Indeed, new hardware with increased computing power may be produced, hence making the computational challenge more affordable in terms of costs and feasibility. Moreover, any appreciation of the value of the funds in the account renders a stretched key less secure, since the pay-off if it is cracked becomes a larger proportion of the investment required to crack it. Considering that a personal computer can perform around 6500 SHA-1 hashes per second, one can easily show that the key stretching solution quickly becomes insecure. A key stretching program can use 6500 rounds of hashes and delay the user for about one second. From the attacker's point of view, as any regular password testing typically requires one hash operation, using the key stretching increases his workload by a factor $2^{16}$ (equivalent to extra 16 bits of entropy added to the regular password). According to Moore's law, the computer performance in terms of speed is supposed to double every 1.5 years, meaning that possibly one more bit of key strength every 1.5 years may become easily determined. To maintain a constant level of security, the key stretching rounds should be doubled every 1.5 years but this would require (i) a higher computational cost for the user to perform the key stretching; (ii) the designer of the key stretching algorithm should take this aspect into consideration and decide the lifespan of the system. Blockchain miners can also be used to perform the computational tasks of the key stretching process 'while they mine', thereby incurring almost no extra cost; moreover, this can be done without revealing the user's password to the miner. However, such an arrangement would also permit miners to attempt to brute-force user's passwords 'for free', which defeats the entire objective of key stretching.

Thus, it is desirable to provide improved methods and devices which allow a user to authorise a transaction with a password in a manner that can provide enhanced security and thwart attacks that attempt to reverse engineer the password and transfer cryptographic assets controlled by the password.

Thus, in accordance with the present invention there is provided a method as defined in the appended claims.

Therefore, in accordance with the invention there may be provided a blockchain-implemented method and corresponding system. The invention may be described as a blockchain-implemented security method(s) and corresponding system(s).

The method may provide a method comprising involving a requestor and a group of nodes, which can include generating a cryptographic key of the requestor based on a password chosen by the requestor and a plurality of first quantities sent by the group of nodes. The plurality of first quantities can be based on private key shares of the group of nodes and a generator function of a digital signature scheme employing a bilinear mapping on an elliptic curve. The method can further include generating a cryptographic signature for a blockchain transaction of the requestor, the cryptographic signature corresponding to the cryptographic key of the requestor based on the bilinear mapping on an elliptic curve of the digital signature scheme. The cryptographic signature can be based on the password chosen by the requestor and a plurality of second quantities sent by the group of nodes.

The plurality of second quantities can be based on the private key shares of the group of nodes. The method can further involve verifying the cryptographic signature of the blockchain transaction using the cryptographic key of the requestor.

Additionally or alternatively, the method can employ a consensus mechanism involving the group of nodes to allow a user (the requestor) to authorise a transaction with a password in a secure way. The password is never exposed directly in any phase of the method. The entropy of the password is not required to be high (and thus can be low), which can improve the memorability of the password as the amount of information of the password is proportional to the entropy of the password.

Additionally or alternatively, the method employs a group of nodes where each node joins the group through transfer of a digital asset to the group, and where each node of the group stores a corresponding private key share.

Additionally or alternatively, the method can include a funding phase where the group of nodes receive a funding transaction broadcast by the requestor, wherein the funding transaction specifies one or more digital assets of the requestor where all or some of such digital assets may be transferred using a password chosen by the requestor.

Additionally or alternatively, the method can include a payment authorisation phase where the group of nodes receive a spending transaction that transfers some portion of the one or more digital assets of the requestor as specified in the funding transaction. The spending transaction includes a cryptographic signature corresponding to the cryptographic key of the requestor. The group of nodes verify the signature of the spending transaction using the cryptographic key of the requestor.

Additionally or alternatively, the method can further include an initialisation phase where the group of nodes receive an initialisation transaction broadcast by the requestor, wherein the initialisation transaction indicates a desire to set a password associated with the requestor. The group of nodes generate respective first quantities in response to the initialisation transaction and send respective first messages to the requestor that includes the respective first quantities.

Additionally or alternatively, the payment authorisation phase can include the group of receiving a pre-spending transaction broadcast by the requestor, wherein the pre-spending transaction transfers a transaction deposit and includes the hash of at least part of the spending transaction, wherein the hash of at least part of the spending transaction is based on a hash function of the digital signature scheme. The group of nodes generate respective second quantities in response to the pre-spending transaction and send respective second messages to the requestor that includes the respective second quantities.

Additionally or alternatively, the initialisation transaction can include an initialisation fee that is paid by the requestor to the group. The initialisation fee can be paid to a public group address associated with the group. The initialization fee can be returned to the requestor in the event that at least one node of the group sends an inconsistent first quantity to the requestor. The inconsistency of the first quantities can be determined using a verifiable secret sharing scheme.

Additionally or alternatively, the transaction deposit of the pre-spending transaction can be locked under a public key associated with the group of nodes. The pre-spending transaction can include a spending fee. The group can selectively transfer the transaction deposit less the spending fee back to the requestor in the event that the verifying is successful. The group can selectively confiscate the transaction deposit in the event that the verifying fails. The transaction deposit can be returned to the requestor in the event that at least one node of the group of nodes sends an inconsistent second quantity to the requestor. The inconsistency of the second quantities can be preferably determined using a verifiable secret sharing scheme.

Additionally or alternatively, the spending fee can be paid to a public key associated with the group of nodes. The nodes of the group can verify that the spending fee is sufficient, wherein sufficiency of the spending fee is preferably based on computation resources required to process the third transaction and the spending transaction. The nodes of the group can selectively bypass further processing of the pre-spending transaction in the event of failed verification of sufficiency of the spending fee. The nodes of the group can selectively distribute the spending fee to the group.

Additionally or alternatively, the funding transaction can specify that the one or more digital assets of the requestor are locked by the cryptographic key of the requestor and thus can be spent by the corresponding cryptographic signature. In this embodiment, the group of nodes and optionally by other nodes that do not belong to the group can verify the cryptographic signature of the signed spending transaction using the cryptographic key of the requestor.

Additionally or alternatively, the funding transaction can specify that the one or more digital assets of the requestor are locked by a public key of the group and thus can be spent by a signature based on a threshold number of private key shares of the group. In this embodiment, only the group of nodes can verify the signature of the signed spending transaction using the cryptographic key of requestor. Upon successful verification of the signature of the signed spending transaction, the group can cooperate to generate a signature based on a threshold number of private key shares of the group and to construct a secondary spending transaction that includes this signature.

In embodiments, the first quantities can be included in private messages sent from respective nodes of the group to the requestor and encrypted with a public key of the requestor. The nodes of the group can have a trusted execution environment that stores the private key share of the node, and the trusted execution environment of the node can generate the first quantity based at least in part on the private key share of the node and the generator function of the signature scheme. Each private message can be associated with the public key of the trusted execution environment of a node and can be signed with the corresponding private key of the trusted execution environment of the node.

In embodiments, the second quantities can be included in private messages sent from respective nodes of the group to the requestor and encrypted with a public key of the requestor. The nodes of the group can have a trusted execution environment of the node that generates the second quantity based at least in part on the hash of the unsigned spending transaction as included in the third transaction and the private key share of the node. Each private message can be associated with the public key of the trusted execution environment of a node and can be signed with the corresponding private key of the trusted execution environment of the node.

In embodiments, one or more nodes can mine the funding transaction and the signed spending transaction for storage in a proof-of-work blockchain.

In accordance with the invention, there may be provided an electronic device which includes a processor, computer memory and a network interface device. The memory has stored thereon computer executable instructions which, when executed, configure the processor to perform a method described herein.

In accordance with the invention, there may be provided a computer readable storage medium. The computer readable storage medium includes computer-executable instructions which, when executed, configure a processor to perform a method described herein.

These and other aspects of the present invention will be apparent from and elucidated with reference to, the embodiment described herein. An embodiment of the present invention will now be described, by way of example only, and with reference to the accompany drawings, in which.

Figure 3:
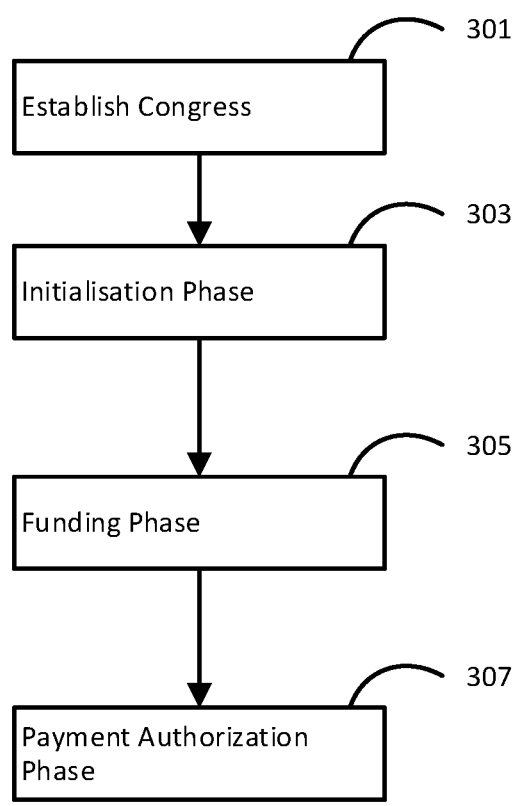
FIG. 3 is a high-level flowchart of an example method that employs a consensus mechanism involving a congress to allow a user to authorise a transaction with a password in a secure way.

FIGS. 5A-5D, collectively, is a flow chart illustrating exemplary details of the initialisation phase of FIG. 3.

Figure 6:
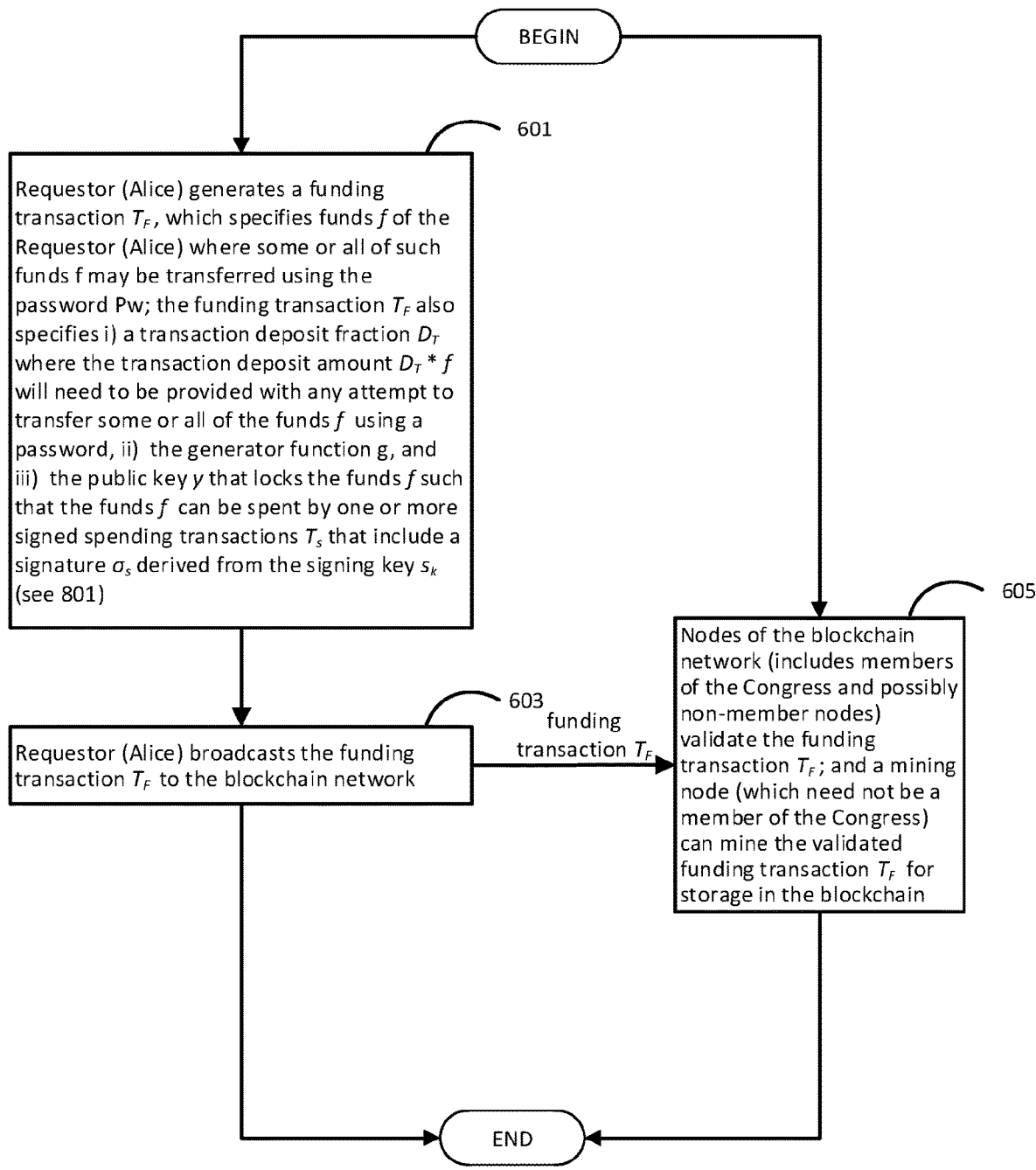
Figure 7A:
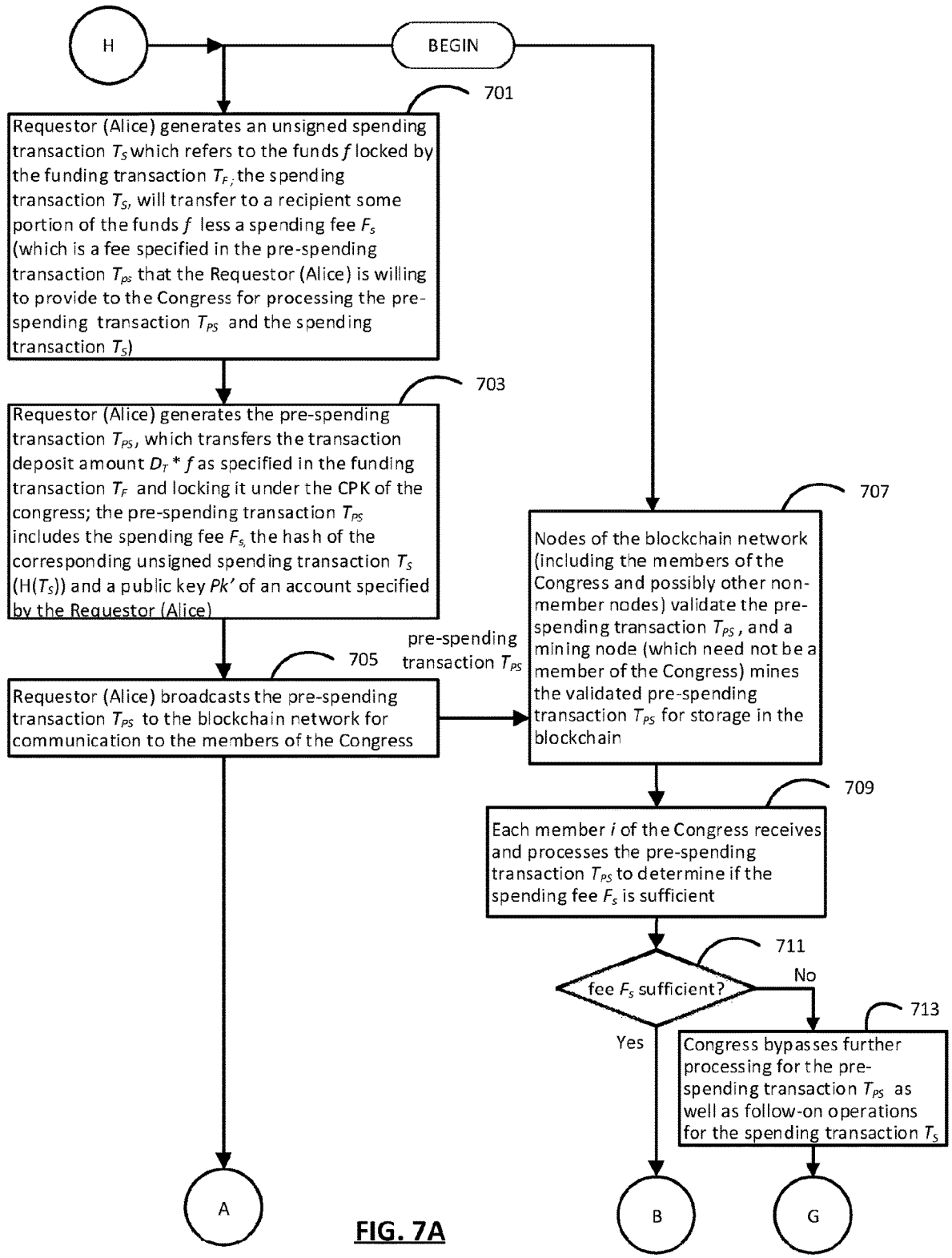
Figure 7B:
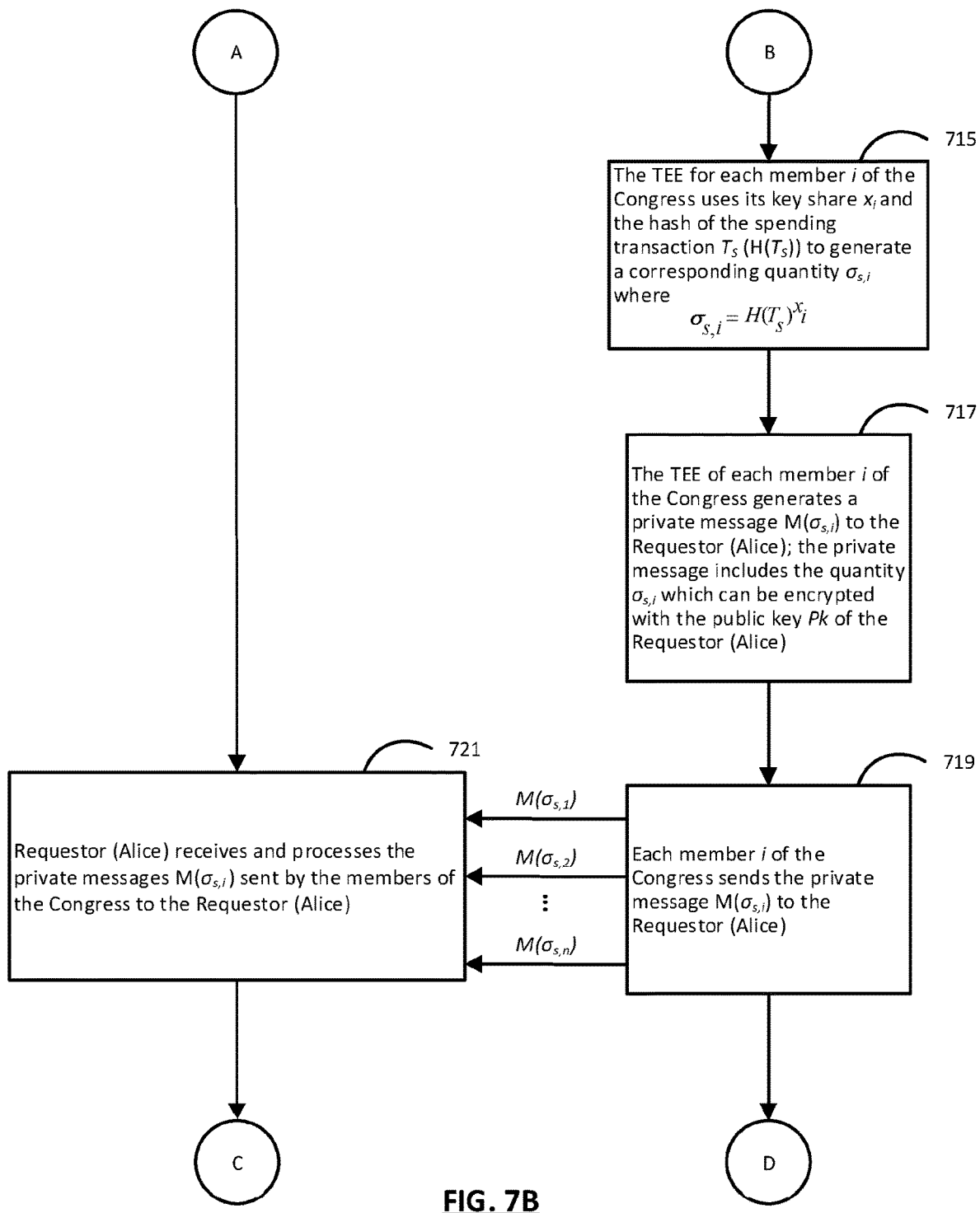
Figure 7C:
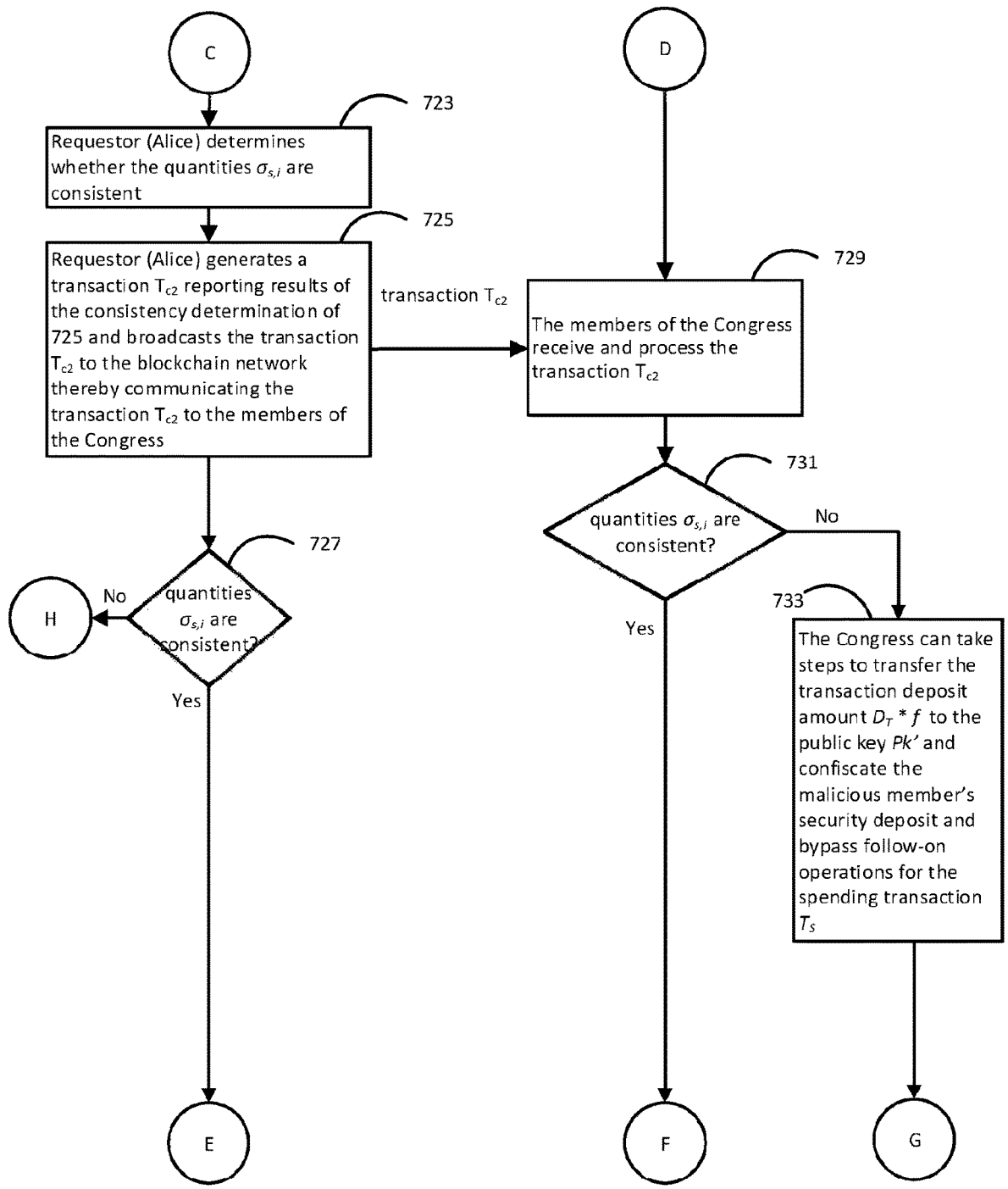
Figure 7D:
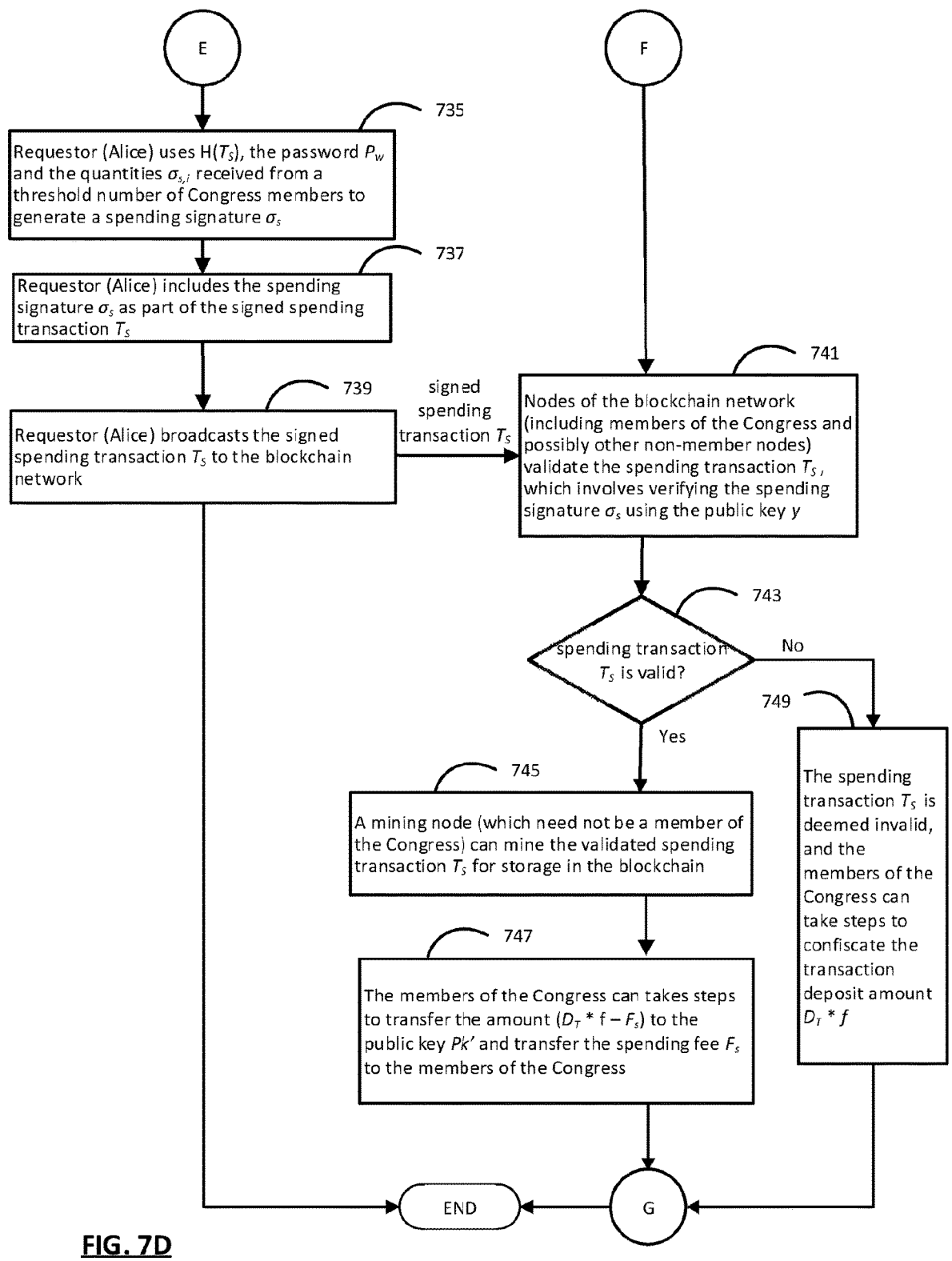

FIG. 6 is a flow chart illustrating exemplary details of the funding phase of FIG. 3.

FIGS. 7A-7D, collectively, is a flow chart illustrating exemplary details of the payment authorisation phase of FIG. 3.

Figure 8A:
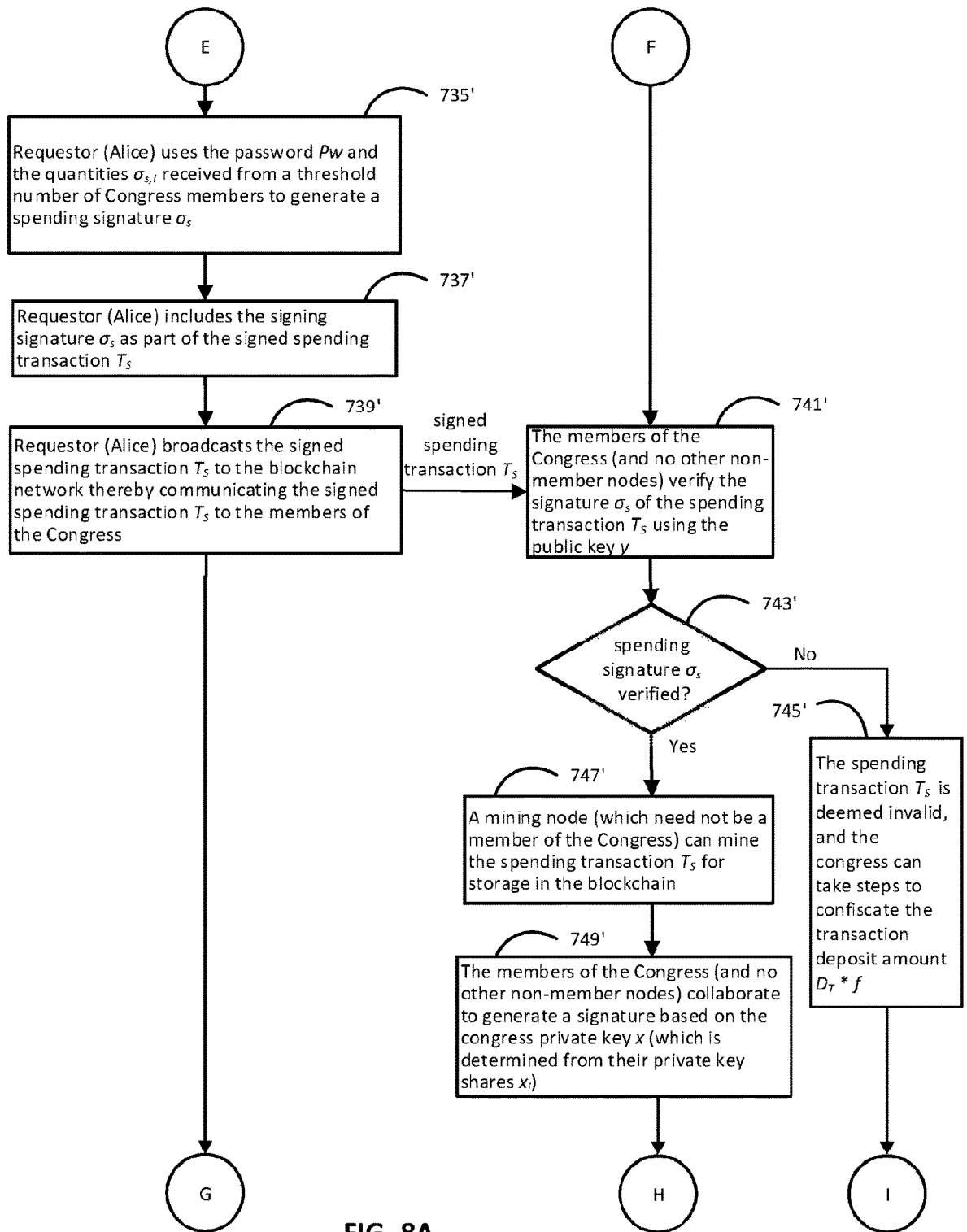
Figure 8B:
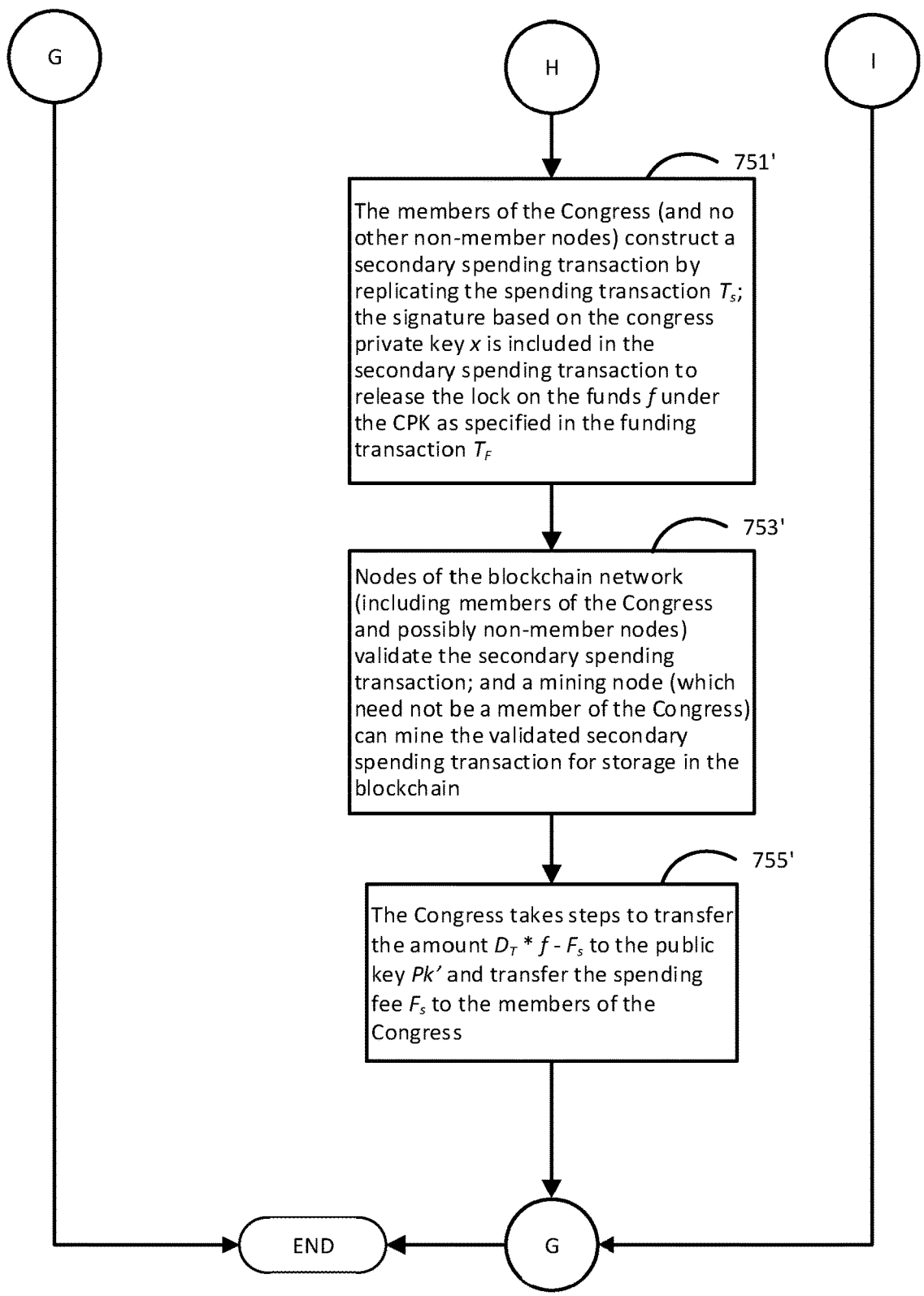

FIGS. 8A-8B is a flowchart of another example method that employs a consensus mechanism involving a congress to allow a user to authorise a transaction with a password in a secure way.

Blockchain Network

Figure 1A:
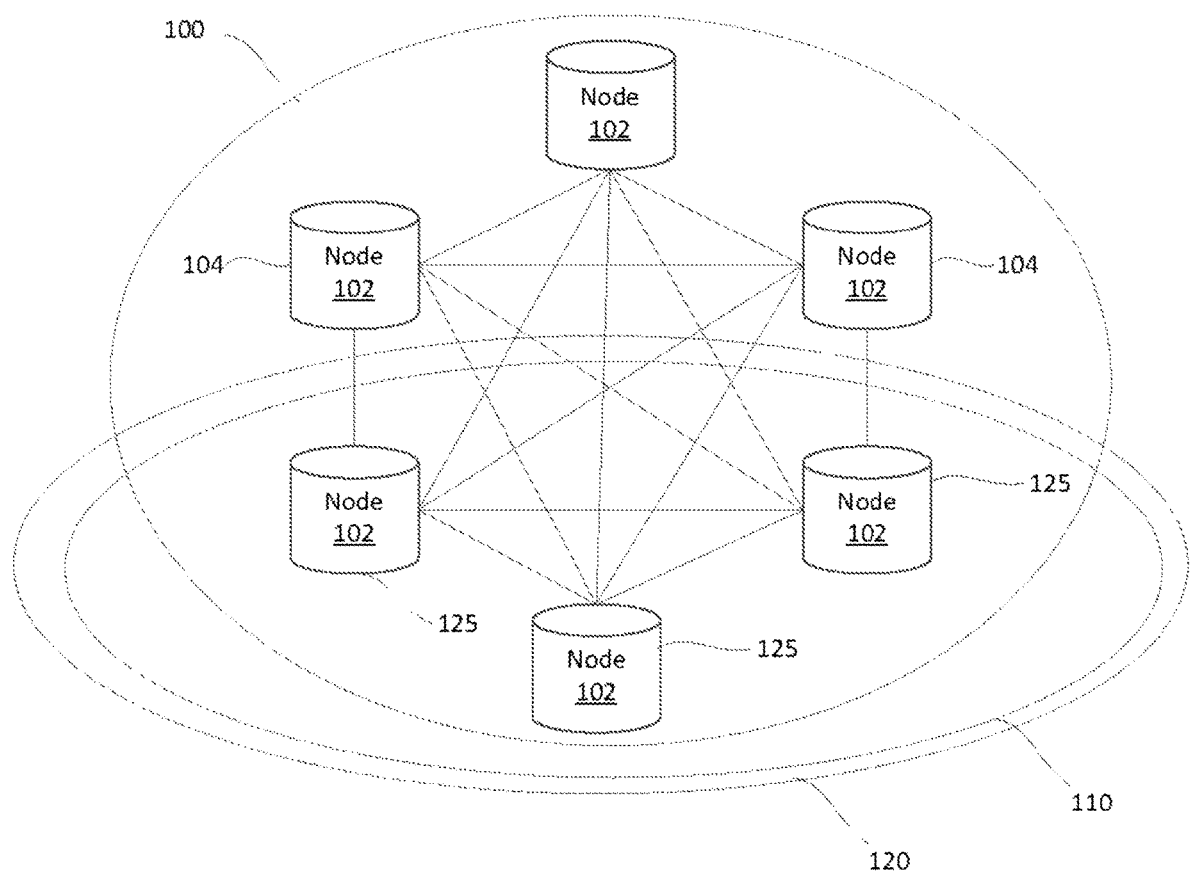
FIG. 1A illustrates a block diagram of an example blockchain network.

Reference will first be made to FIG. 1A which illustrates, in block diagram form, an example blockchain network 100 associated with a blockchain. The blockchain network may be a public blockchain network, which is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, for example.

The electronic devices that run the blockchain protocol and that form the nodes 102 of the blockchain network 100 may be of various types including, for example, computers such as desktop computers, laptop computers, tablet computers, servers, mobile devices such as smartphones, wearable computers such as smart watches or other electronic devices.

Nodes 102 of the blockchain network 100 are coupled to one another using suitable communication technologies which may include wired and wireless communication technologies. Such communication adheres to the protocol associated with the blockchain. For example, where the blockchain is a bitcoin blockchain, the bitcoin protocol may be used.

Nodes 102 maintain a global ledger of all transactions on the blockchain. Thus, the global ledger is a distributed ledger. Each node 102 may store a complete copy or a partial copy of the global ledger. In the case of a blockchain secured by proof-of-work, transactions by a node 102 affecting the global ledger are verified by other nodes 102 so that the validity of the global ledger is maintained. When the blockchain is a proof-of-work based blockchain, blocks are also verified by checking the proof-of-work submitted with the block.

At least some of the nodes 102 operate as miners 104 of the blockchain network 100. The blockchain network 100 of FIG. 1A is a proof-of-work block chain in which miners 104 perform expensive computations in order to facilitate transactions on the blockchain. For example, the proof-of-work blockchain may require miners to solve a cryptographic problem. In Bitcoin, the miners 104 find a nonce such that a block header hashes, with SHA-256, to a number that is less than a value defined by the current difficultly. The hashing power required for the proof-of-work algorithm means that a transaction is considered practically irreversible after a certain number of blocks have been mined on top of it. A miner 104 who solves the cryptographic problem creates a new block for the blockchain and broadcasts the new block to other nodes 102. The other nodes 102 verify that the miner 104 has, in fact, solved the cryptographic problem and has, therefore, demonstrated sufficient proof-of-work before accepting that the block should be added to the blockchain. The block is added to the blockchain (i.e., to the distributed global ledger) by consensus of the nodes 102.

The block created by the miner 104 includes transactions which had been broadcast to the block chain by nodes 102. For example, the block may include transactions from an address associated with one of the nodes 102 to an address associated with another of the nodes 102. In this way, the block serves as a record of a transaction from one address to another. The party which requested that the transaction be included in the block proves that they are authorized to initiate the transfer (e.g., in the case of Bitcoin, to spend the Bitcoin) by signing the request using a private key corresponding to their public key. The transfer may only be added to the block if the request is validly signed.

In the case of Bitcoin, there is a one-to-one correspondence between public keys and addresses. That is, each public key is associated with a single address. Thus, any reference herein to transferring digital assets to or from a public key (e.g., paying into the public key) and transferring digital assets to or from the address associated with that public key refer to a common operation.

Some of the nodes 102 may participate as validating nodes, and may (or may not) operate as miners as well. Validation nodes perform validation of transactions, which can involve checking signature(s), confirming reference to valid UTXO, etc.

The example of FIG. 1A includes five nodes 102, three of which are participating as miners 104. In practice, the number of nodes 102 or miners 104 may be different. In many blockchain networks, the number of nodes 102 and miners 104 may be much greater than the number illustrated in FIG. 1A.

Figure 1B:
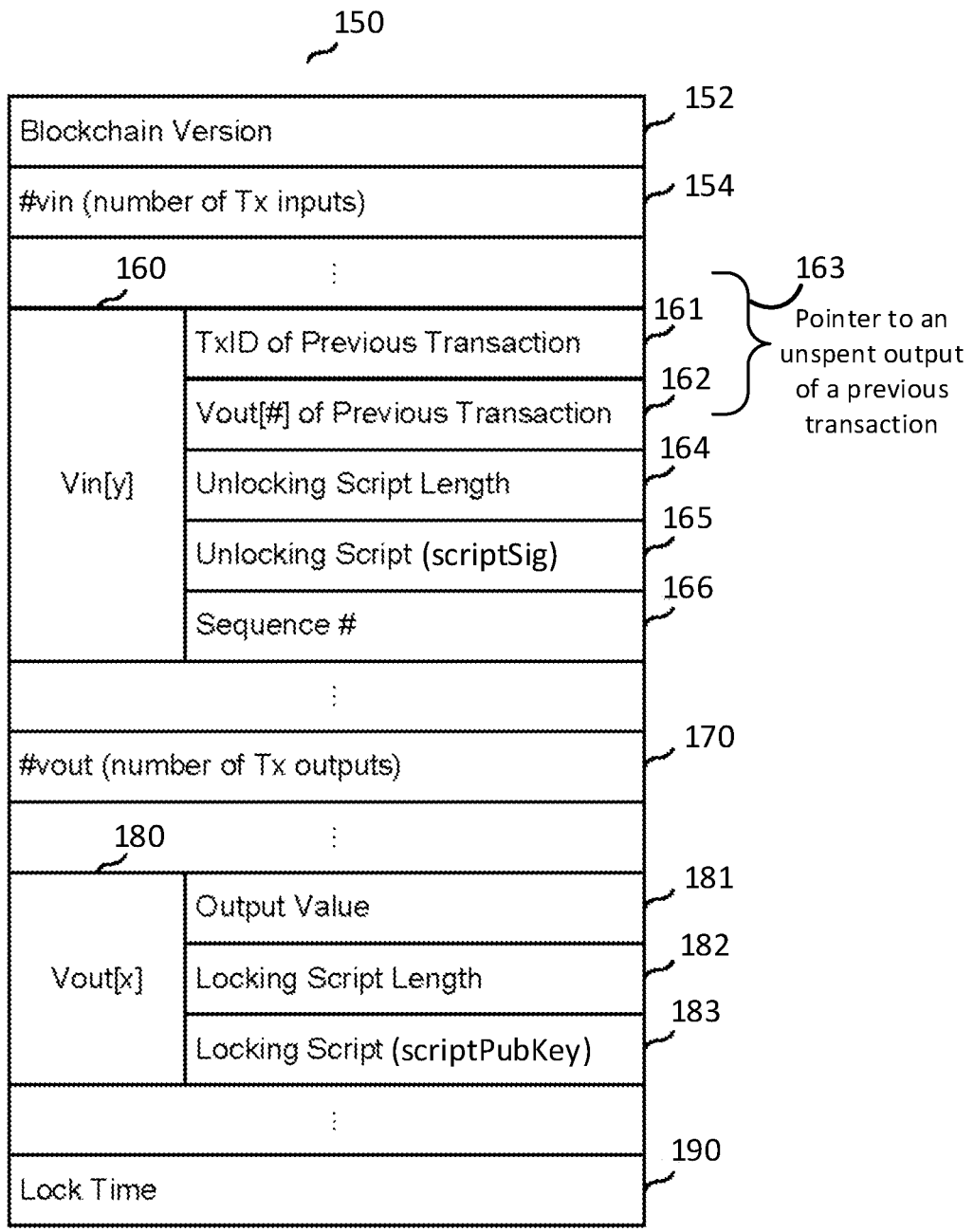
FIG. 1B illustrates an example of a blockchain transaction, specific to a Bitcoin blockchain environment.

FIG. 1B illustrates an example of a transaction 150 as might be stored in the Bitcoin blockchain. Other variations with similar functionality are possible. The data elements or fields of a transaction might be as shown in FIG. 1B and might include additional fields beyond those described in this disclosure. As shown, there is a blockchain version field 152 that has a value to indicate a blockchain protocol version of the transaction 150. A # vin field 154 indicates how many transaction inputs (explained below) are present in the transaction 150. Other fields might be present and not illustrated, but for each transaction input (illustrated here as the example Vin[y] 160), there is a set of fields including a transaction ID (TxID) 161 of a previous transaction, an index 162 to one of the outputs of that previous transaction (the transaction that supplies the transaction output to match transaction input 160), where the TxID 161 and the index 162 together form a pointer 163 that references the output of the previous transaction. As used herein, the term "previous transaction" when used in context with respect to a current or present transaction refers to a specific prior transaction (or transactions) having a transaction output that is referred to (and "spent") by the current or present transaction. In examples, the current or present transaction might be referred to as the "spending transaction".

In some blockchain implementations, there is no centralised mechanism for assigning unique TxID values and instead, there is a decentralised mechanism for generating a unique TxID for a transaction, such as by generating a hash of the contents of the transaction itself. Since a valid transaction cannot have all of the exact same content as another valid transaction, each valid transaction will have a unique hash for its TxID (aside from the astronomically low probability of a hash collision). However implemented, it is assumed herein that each transaction has a unique transaction ID. Due to the nature of hashing, once a TxID is generated from a transaction's content, none of that content can be changed and have the TxID remain valid for that transaction.

As shown in FIG. 1B, the set of fields for the transaction input Vin[y] 160 also includes an Unlocking Script_Length field 164 indicating a length of an unlocking script that follows, an Unlocking Script field 165 containing an unlocking script (commonly referred to as "scriptSig" in the Bitcoin protocol) for the vin[y] 160 that "unlocks" a corresponding locking script of the transaction output pointed to by the pointer 163, and a sequence #field 166 that might be used to constrain the transaction 150.

Although FIG. 1B only explicitly shows one transaction input and one transaction output, more than one of each are possible. Following the transaction inputs, there is a # vout field 180 that indicates how many transaction outputs (also explained below) are present in the transaction 150. For each transaction output (illustrated here as the example Vout[x] 180), there is a set of fields including an output value field 181 that indicates the transaction value provided by this transaction output Vout[x] 180, a Locking_Script_Length field 182 indicating a length of a locking script that follows, and a Locking_Script field 183 containing a locking script (commonly referred to as "scriptPubKey" in the Bitcoin protocol) for this transaction output Vout[x] 180. As explained, the transaction value of this transaction output can be "spent" by anyone able to create a spending transaction that has a transaction input that has an unlocking script that a blockchain node will verify as TRUE when performing a verification using that unlocking script and that locking script. Other fields might follow the transaction output fields, such as a lock time field 190 that can constrain the transaction 150 to be not active prior to a specified future time or prior to a specified future block. Where each transaction input of a spending transaction points to a corresponding transaction output of a previous transaction output and the previous transaction output includes the transaction value, the transaction input need not contain a field indicating that transaction value.

As will be explained below, various nodes 102 may cooperate to form a group which will be referred to herein as a congress 110. In the example illustrated, three nodes 102 are shown as taking part in the congress 110. However, the actual number of congress 110 members may be much larger.

The congress 110 is an open-membership group which may be joined by any node 102 upon submission of sufficient stake to a pool associated with the congress 110. For example, a node may join a congress through transfer of a digital asset, such as digital currency (such as bitcoin), tokens or other stake or value, to an account associated with the congress 110. A node 102 joining a congress may be any node in the blockchain network including both mining and non-mining nodes. In at least some applications of a congress, a node acting as a congress member monitors the blockchain in the sense that they download (but not necessarily retain) the full blockchain. Techniques for establishing and maintaining the congress 110 are described in GB Patent Appl. No. 1705867.8, filed on 11 Apr. 2017, and GB Patent Appl. No. GB1705869.4, filed on 11 Apr. 2017.

The members of the congress may form an alternate chain network 120. The alternate chain network 120 creates and maintains a distributed ledger which will be referred to as an alternate chain. The alternate chain network 120 may be deployed to arbitrate an algorithmic-related dispute generated on the blockchain network 100. Such a dispute may exist where the reliability of processor-generated work product of one node has been challenged by another node. The alternate chain network 120 can also possibly be deployed for other purposes.

While the blockchain associated with the blockchain network 100 is a proof-of-work blockchain, the alternate chain is a proof-of-stake blockchain. The proof-of-stake based alternate chain network 120 provides an alternative mechanism for achieving consensus. In the proof-of-stake alternate chain, the blockchain is secured by proof-of-stake rather than proof-of-work. Under proof-of-stake, the miners 125 of the alternate chain deposit a security deposit of digital assets and, the probability of being selected as the node to mine a block is proportional to the quantum of the digital assets provided as deposit. Such a proof-of-stake blockchain systems can be used to avoid the computational expense and energy typically required to mine on a proof-of-work blockchain.

A plurality of nodes 102 function as miners 125 of the alternate chain network 120. At least some of the miners 125 of the alternate chain network 120 may not serve as miners 104 of the blockchain network 100. Since the alternate chain network 120 is a proof-of-stake blockchain network, the miners 125 deposit digital assets in order to be included as miners. More particularly, the miners 125 for the alternate chain form a bonded validator set in order to mine on the alternate chain network 120. These miners 125 can also be members of a congress 110 associated with the proof-of-work blockchain network 100. That is, nodes 102 which are part of both the proof-of-work blockchain network 100 and the alternate chain network 120 act as miners 125 for the alternate chain network 120 and as members of a congress 110 established on the proof-of-work blockchain network 100. These miners 125 join the congress 110 and take part in the congress 110 according to methods described below. Their deposit of digital assets into a congress pool is made in the proof-of-work blockchain. That is, the congress members deposit their "stake" on the proof-of-work blockchain network 100 to become congress members which allows them to act as miners 125 on the alternate chain by forming a bonded validator set.

In embodiments, the alternate chain of the alternate chain network 120 can be a proof-of-stake ghost chain, which is a temporary proof-of-stake blockchain. Unlike a traditional blockchain, the proof-of-stake ghost chain is configured to terminate once it has achieved its purpose. That is, the ghost chain is a single-purpose blockchain which ceases to exist once its purpose has been achieved. The proof-of-stake ghost chain includes a first block, which may be referred to as a genesis block, which is only created when the proof-of-stake ghost chain is deployed for its purpose. Details of a proof-of-stake ghost chain network are described in GB Patent Appl. No. GB1705869.4, filed on 11 Apr. 2017.

Electronic Device operating as A Node

Figure 2:
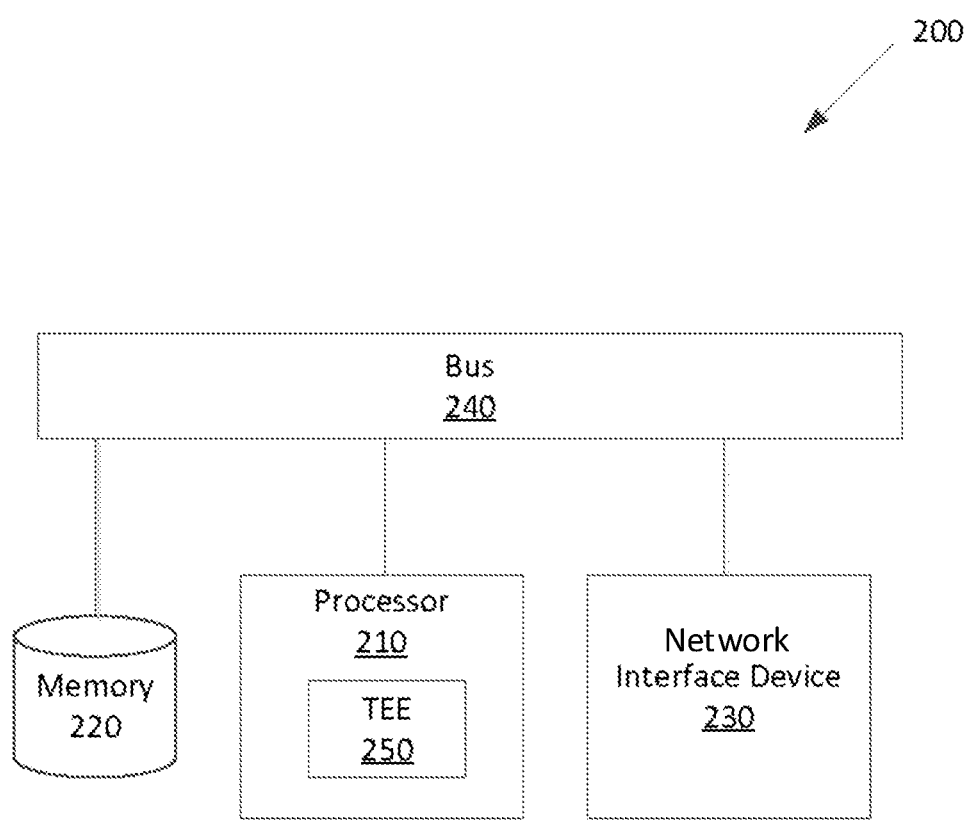
FIG. 2 illustrates a block diagram of an example electronic device which may function as a node in a blockchain network.

FIG. 2 is a block diagram illustrating components of an example electronic device 200 which may serve as a node 102 (FIG. 1A) in the blockchain network 100 (FIG. 1A). The example electronic device 200 may also be referred to as a processing device. The electronic device may take various forms including, for example, a desktop computer, laptop computer, tablet computer, server, mobile device such a smartphone, wearable computer such as a smart watch, or a form of another type.

The electronic device 200 includes a processor 210, a memory 220 and a network interface device 230 for data communication over a network. These components may be coupled directly or indirectly to one another and may communicate with one another. For example, the processor 210, memory 220 and network interface device 230 may communicate with each other via a bus 240. The memory 220 stores a computer software program comprising machine-readable instructions and data for performing functions described herein. For example, the memory may include processor-executable instructions which, when executed by the processor 210, cause the electronic device to perform a method described herein. The processor-executable instructions may include instructions which, when executed by the processor 210, cause the electronic device to implement a protocol associated with the blockchain network 100 (FIG. 1A). For example, the instructions may include instructions for implementing the Bitcoin protocol.

The memory 220 may store the global ledger of the blockchain network 100 (FIG. 1A) or a portion thereof. That is, the memory 220 may store all blocks of the blockchain or a portion of the blocks, such as the most recent blocks, or a portion of the information in some blocks. Further, when an alternate chain (e.g., ghost chain) is deployed, the memory 220 may store the alternate chain (e.g., ghost chain) or a portion thereof.

While the memory 220 is illustrated with a single block in FIG. 2, in practice the electronic device 200 may include multiple memory components. The memory components may be of various types including, for example, RAM, HDD, SSD, flash drives, etc. Different types of memory may be suited to different purposes. Further, while the memory 220 is illustrated separately from the processor 210, the processor 210 may include embedded memory.

As illustrated in FIG. 2, the processor 210 may include a secure area referred to as a Trusted Execution Environment (TEE) 250. The TEE 250 is an isolated execution environment which provides additional security to the electronic device 200 such as isolated execution, integrity of Trusted Applications and asset confidentiality. The TEE 250 is implemented, at least in part, at a hardware level so that instructions and data executed within the TEE 250 are protected against access and manipulation from the rest of the electronic device 200 and from external parties such as the owner of the electronic device. The data and computations within the TEE 250 are secured from the party operating the node 102 that includes the TEE 250. The TEE 250 can provide execution space and data storage which guarantees that the computer instructions and data loaded inside the TEE 250 are protected in terms of confidentiality and integrity. The TEE 250 can be implemented as a secure virtual machine that executes on the processor 210. In alternate embodiments, the TEE 250 can be implemented by a dedicated secure processor that is separate and distinct from the processor 210. The TEE 250 may be used to protect the integrity and confidentiality of important resources, such as keys. The TEE 250 can be implemented, at least in part, at a hardware level so that instructions and data executed within the TEE 250 are protected against access and manipulation from the rest of the electronic device 200 and from external parties such as the owner of the electronic device. The data and computations within the TEE 250 can be secured from the party operating the node 102 that includes the TEE 250.

The TEE 250 may operate to instantiate an enclave and then add pages of memory one at a time, while cumulatively hashing. A similar operation may also be performed on a remote machine (which may be a developer machine or another machine) so that the remote machine determines and stores the hash that is expected. The contents of an enclave can, therefore, be verified by any remote machine to ensure that the enclave is running an approved algorithm. This verification may be performed by comparing hashes. When an enclave is fully built, it is locked down. It is possible to run the code in the TEE 250 and to send secrets to the code, but the code cannot be changed. A final hash may be signed by an attestation key (which is internal to the TEE) and may be made available to a data owner to verify it before the data owner sends any secrets to the enclave.

The TEE 250 may be used to protect the confidentiality and integrity of a private key share associated with a congress public key used by the congress 110 (FIG. 1A). For example, the TEE 250 may be used for the generation and storage of private key shares. The TEE 250 is intended to ensure that no member is able to directly obtain the private key share held within the TEE 250 enclave, or information about other private key shares from inter-member communication or inter-enclave communication. The protocol is also robust against the compromise of a threshold of enclaves. Further, the TEE 250 may enable remote attestation which may be used by a node 102 (FIG. 1A) to prove to other nodes 102 that a TEE 250 is authentic and is running approved computer executable instructions for a protocol that is implemented by a congress 110. Remote attestation may be provided by the TEE 250 by running a particular piece of code and sending a hash of the code, internal to the enclave, signed by an internal attestation key for the enclave.

The TEE 250 may be used to attest to secure deletion of the private key share when a member of a congress 110 who has previously used the private key share on the electronic device 200 has chosen to leave the congress. The electronic device 200 may signal attestation of deletion to other congress members through a remote attestation protocol provided in the TEE 250. Attestation of deletion may be required before a member is permitted to withdraw their member deposit. That is, return of the deposit may be conditional on attestation to deletion of the private key share held within the member's enclave.

The TEE 250 may be equipped with a secure random number generator, which is internal to an enclave of the TEE, which can be used to generate private keys, random challenges, or other random data. The TEE 250 may also be configured to read data from external memory and may be configured to write data to the external memory. Such data may be encrypted with a secret key held only inside the enclave.

The TEE 250 may be implemented using various platforms such as Trusted Platform Module (TPM) or Intel Software Guard Extensions (SGX). SGX, for example, supports remote attestation, which enables an enclave to acquire a signed statement from the processor that is executing a particular enclave with a given hash of member known as a quote. A third-party attestation service such as Intel Attestation Service (IAS) may certify that these signed statements originate from authentic TEEs conforming to the SGX specification.

The electronic device 200 acts as a node 102 of the blockchain network 100 (FIG. 1A) and may join and otherwise take part in a congress 110 (FIG. 1A). A congress 110 is formed when a group of digital asset bearers pool digital assets, such as digital currency, tokens or other stake or value supported by the blockchain network 100 (FIG. 1A), and that pool of digital assets is locked under a single public key (the congress public key) such that shares in the corresponding private key are held by congress members (preferably inside TEEs of the congress members) in proportion to the quantity of assets contributed to the pool. The electronic device 200 can also act as a node 102 of the alternate chain network 120 (FIG. 1A).

Congresses

The congress 110 may be a permissioned group or non-permissioned group. That is, the congress 110 may be joined by any node in the blockchain network 100 (FIG. 1A) (i.e., by any node that monitors and stores at least a portion of the information in the blockchain). To join the congress 110, a node 102 transfers one or more digital assets to a digital asset pool associated with the congress 110 (i.e., to a public group address associated with one or more digital assets which are, in turn, associated with other members of the congress). This digital asset pool may be referred to as a congress pool. For example, a node 102 may join a congress 110 by transferring (i.e., depositing) such digital assets to an address associated with the congress pool (i.e., to a "congress address" which may also be referred to as a public group address). The digital assets are placed under the control of a group threshold signature with a single public key, referred to as a congress public key. Congress members hold distributively-generated private key shares. The number of shares held by a particular congress member may be in proportion to the amount deposited in the pool by that particular congress member.

The digital assets that are controlled by the congress 110, which include any digital assets transferred to the congress address, can be placed under the control of a threshold signature scheme. Under the threshold signature scheme, a group of members whose total private key share holdings exceed a threshold are needed to produce a valid signature which allows the digital assets to be transferred away from control of the congress 110. That is, at least a threshold number of private key shares must be used to generate a valid signature for any outgoing transfer of digital assets controlled by the congress 110.

The congress public key or CPK encumbers the digital assets deposited in the congress pool by the members of the congress 110 in return for private key shares, and any digital assets deposited to the address associated with the congress pool (i.e., placed under full, partial or conditional control of the congress) by members or non-members of the congress 110 which have been deposited for reasons other than obtaining private key shares. Non-members or members may deposit digital assets to the address associated with the congress for various reasons.

Since the same congress public key may encumber both member deposits (i.e., digital assets provided by congress members in return for private key shares) and digital assets provided by members or non-members for other purposes, at least some deposits to the congress public key may be specially flagged to indicate the type of deposit. For example, a transaction that transfers a digital asset to the congress public key may include a flag, identifier or other attribute which indicates the nature of the deposit being made. By way of example, a transaction that transfers the digital asset to congress public key that is not made for the purpose of joining a congress or boosting a stake in congress membership may include a special identifier to indicate that the deposit is being made for another purpose. Such identifiers may be used by nodes 102 associated with the congress 110 when managing private key generation. More particularly, nodes 102 which deposit digital assets for the purpose of joining the group are allocated private key shares for the congress 110 (as a result of making the deposit of digital assets) while other nodes 102 which deposited digital assets for other purposes (e.g., to transfer to a sidechain) may not hold congress private key shares for the congress (i.e., corresponding to the congress public key).

The congress 110 may act as a self-governing group in which cooperative behaviour is enforced through the threat of confiscation of all or part of the member deposit. Non-cooperative or malicious members may have such digital assets confiscated by participation in a cooperative protocol by a number of honest members. Further, when a congress member wishes to leave the congress 110, they may withdraw their member deposit (i.e., request that the congress 110 transfer the member deposit back to that member's personal address). However, withdrawal of funds is only performed if a number of private key shares exceeding a threshold required to generate a valid digital signature are used by members of the group (i.e., the congress) to approve the withdrawal.

The threshold signature scheme implemented by the congress 110 may be of various types. For example, the threshold signature scheme can allow for sharing of signing power between n parties as long as at least a threshold number of private key shares have contributed towards generating a valid signature. Any subset smaller than the threshold cannot generate a valid signature. The threshold signature scheme may be an Elliptic Curve Digital Signature Algorithm (ECDSA) scheme. For example, an ECDSA scheme may be of the type proposed by Ibrahim et al. in "A robust threshold elliptic curve digital signature providing a new verifiable secret sharing scheme", 2003 EIII 46th Midwest Symposium on Circuits and Systems, 1:276-280 (2003). This threshold signature scheme is an extension of a digital signature scheme which is an elliptic curve cryptography based algorithm in which t+1 key shares from a party of n key share holders are required to reconstruct a private key. The scheme may be used to construct a valid signature without having to reconstruct a private key and without any party having to reveal their key share to another party. Note that other suitable signature schemes scan be implemented by the congress 110.

Example Method that Employs Consensus Mechanism Involving a Congress to Allow a User to Authorise a Transaction with a Password Referring now to FIG. 3-8B, methods are illustrated that employ a consensus mechanism involving a congress to allow a user (referred to as a "requestor" herein) to authorise one or more transactions with a user-chosen password. As shown in FIG. 3, the consensus mechanism can be logically partitioned into a sequence of phases, including a phase 301 that establishes the congress, an initialisation phase 303 (which involves an initialisation transaction), a funding phase 305 (which involves a funding transaction), and a payment authorization phase 307 (which involves a pre-spending transaction and a spending transaction). The password is never exposed directly in any phase of the method. The entropy of the password is not required to be high (and thus can be low), which can improve the memorability of the password as the amount of information of the password is proportional to the entropy of the password. The payment authorization phase 307 can possibly be repeated multiple times in order for the requestor to transfer the funds specified in the funding transaction using the password. Furthermore, once the congress is established in phase 301, the operations of the initialisation phase 303, the funding phase 305, and the payment authorization phase 307 can be replicated for multiple users in order to allow multiple individual users to authorise one or more transactions with a user-chosen password.

In embodiments, the consensus mechanism utilizes a digital signature scheme that employs a bilinear map on an elliptic curve. Such a bilinear map is a form of pairing-based cryptography that uses a pairing between elements of two cryptographic groups to a third group with a mapping e. Consider two finite cyclic groups $(G_1=\langle P \rangle, \bullet)$, $(G_2, \bullet)$ of the same prime order q such that the discrete logarithm problem is hard in both groups. A mapping $e: G_1 \times G_1 \rightarrow G_2$ is called a bilinear map if and only if the following three conditions are satisfied:

1. Bilinearity: $\forall P, Q \in G_1, \forall a, b \in Z_q^*, e(aP, bQ)=e(P, Q)^{ab}$,
2. Nondegeneracy: $G_1=\langle P \rangle => \langle e(P, P) \rangle = G_2$.
3. The mapping e is computable in polynomial time.

A deterministic signature scheme using a bilinear map on an elliptic curve was disclosed in D. Boned, B. Lynn, H. Sachem. "Short Signatures from the Weil Pairing," International Conference on the Theory and Application of Cryptology and Information Security, ASIACRYPT 2001, pp 514-532. In this scheme, security is proven under the random oracle model assuming suitably chosen $G_1$, $G_2$. More specifically, let the signer's secret key be $x \in_R Z_q^*$ and the corresponding public key $y=g^x$ is an element in $G_1=\langle g \rangle$. Let $H: \{0,1\}^* \rightarrow G_1$ be a hash function. The steps for signing and verifying a message m are as follows:

Sign(m): the signature σ on message m is $H(m)^x$ (in $G_1$).
Verify(σ, m): accept if and only if $e(g, \sigma)=e(y, H(m))$.

The signature scheme of bone, Lynn and Sachem was generalised to a t-out-of-n threshold signature scheme in A. Boldyreva, "Efficient Threshold Signature, Multisignature and Blind Signature Schemes Based on the Gap-Diffie-Hellman-Group Signature Scheme," PKC 2003, LNCS 2139, pp. 31-46, Springer-Verlag, 2003. In this case, any t signers in the group of n can sign a message m. Let the $i^{th}$ signer's secret key be $x_i \in_R Z_q^*$ and the corresponding public key $y_i=g^{x_i}$ is an element in $G_1=\langle g \rangle$. Here, the master secret $x=\Sigma_i x_i L_i$, where the $L_i$'s are the Lagrange coefficients, which depend on which t values of i that are available. The master public key is $y=g^x$, and the individual public keys $y_i=g^{x_i}$. The steps for signing and verifying a message m are as follows:

Sign(m): each of the t signers creates a share of the signature: $\sigma_i=H(m)^{x_i}$. Note that validity of each $\sigma_i$ can be checked by ensuring that $e(g, \sigma_i)=e(y_i, H(m))$. The signature σ can be determined as $\sigma=\Pi_i \sigma_i^{L_i}$ for t values of i.
Verify(m, σ): accept it and only if $e(g, \sigma)=e(y, H(m))$.

The digital signature scheme used by embodiments of the consensus mechanism of FIGS. 3-8 expand upon the a t-out-of-n threshold signature scheme of Boldyreva by incorporating a user-chosen password into the digital signature scheme as is described below in detail. The phase 301 that establishes the congress includes operations 401-405 of FIG. 4. The initialisation phase 303 includes operations 501-537 of FIGS. 5A-5D. The funding phase 305 includes operations 601-605 of FIG. 6. The payment authorization phase 307 includes operations 701-751 of FIGS. 7A-7D for one embodiment of the present disclosure or possibly the operations 737' to 751' of FIG. 8 for another embodiment of the present disclosure.

Note that the operations performed on behalf of the requestor (or "Alice" in this example) are shown on the left side of FIGS. 3-8, while the operations performed by or on behalf the nodes 102 that are members of the congress are shown on the right side of FIGS. 3-8. The operations performed on behalf of the requestor (or parts thereof) can involve a digital wallet. Such digital wallet can be a hardware wallet, which typically uses a smartcard or USB device for certain functions (such as key generation, key storage, and transaction signing). Alternately, the digital wallet can be a hot wallet, which uses systems that are online and connected in some way to the Internet.

Figure 4:
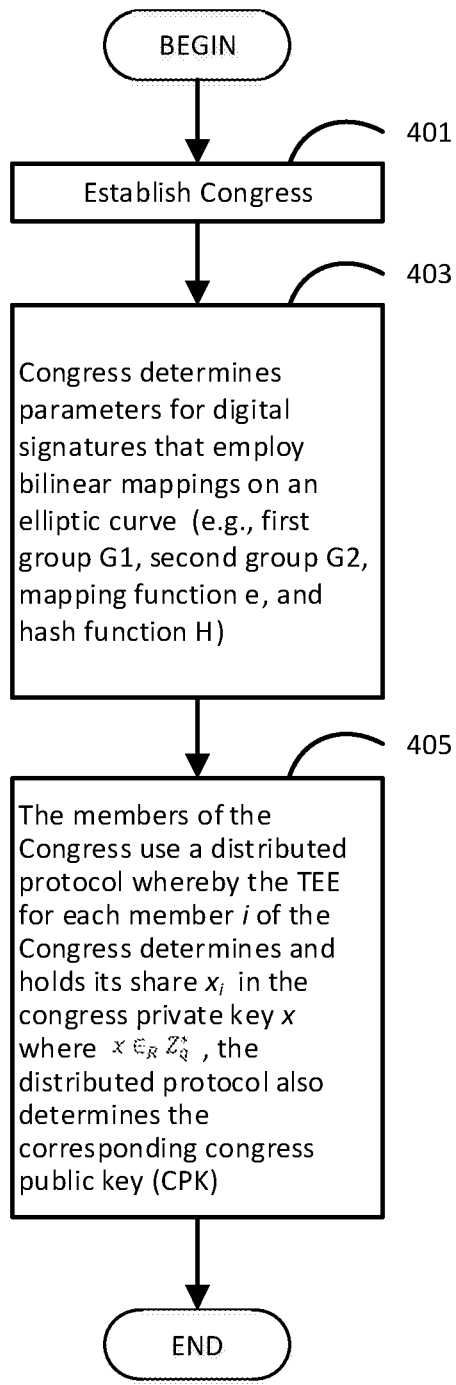
FIG. 4 is a flow chart illustrating exemplary details of the phase of FIG. 3 that establishes a congress.
Figure 5A:
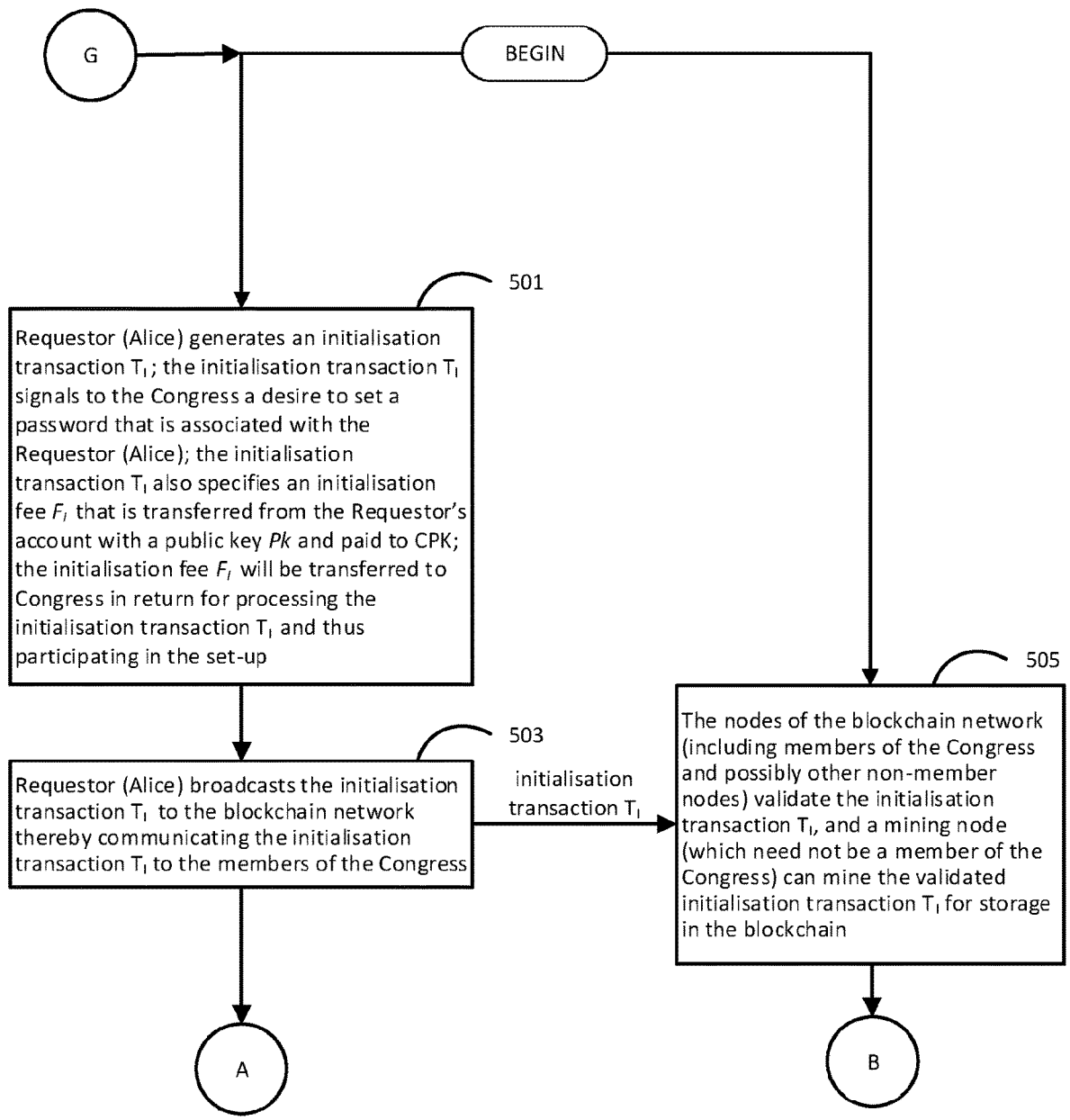
Figure 5B:
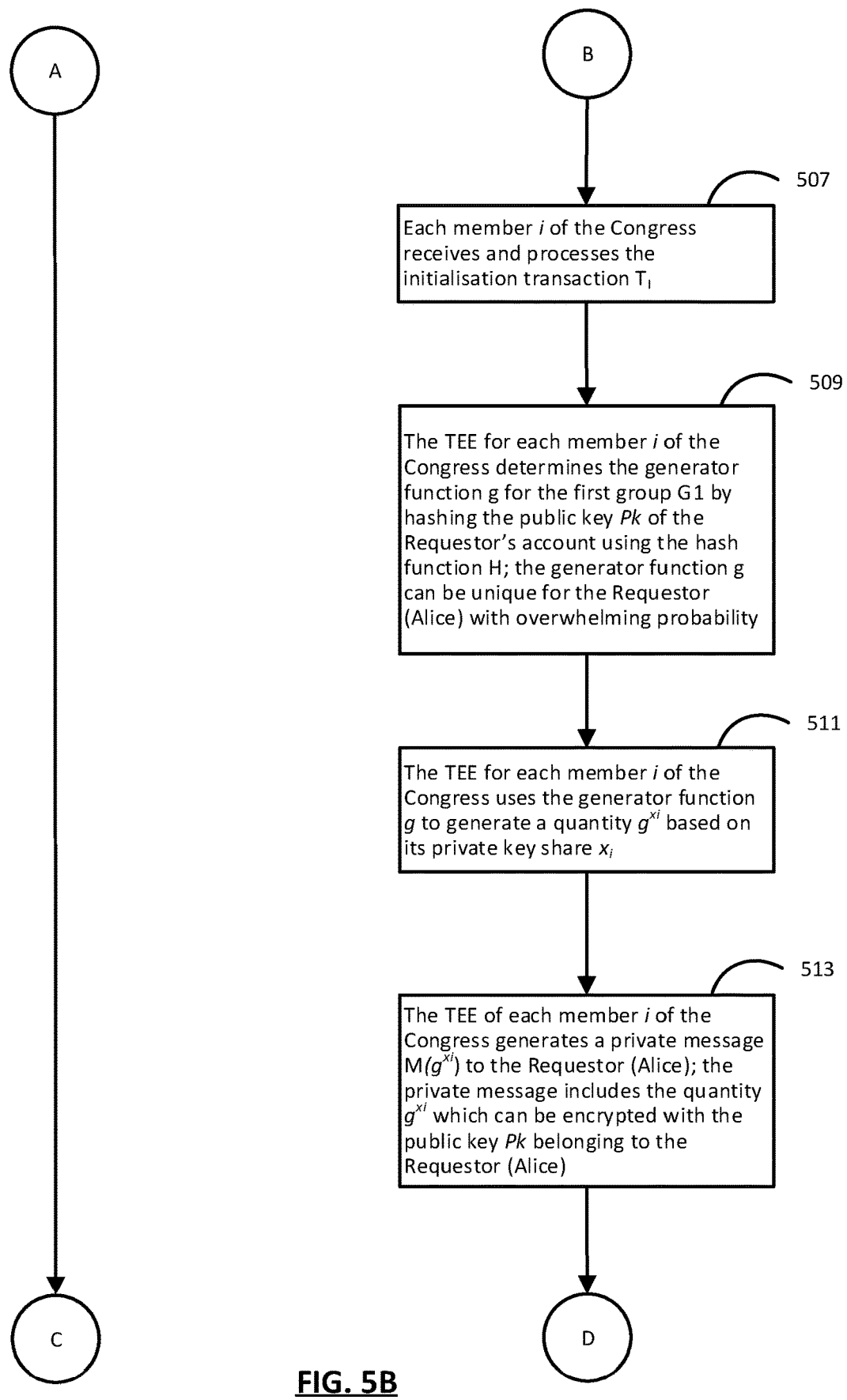
Figure 5C:
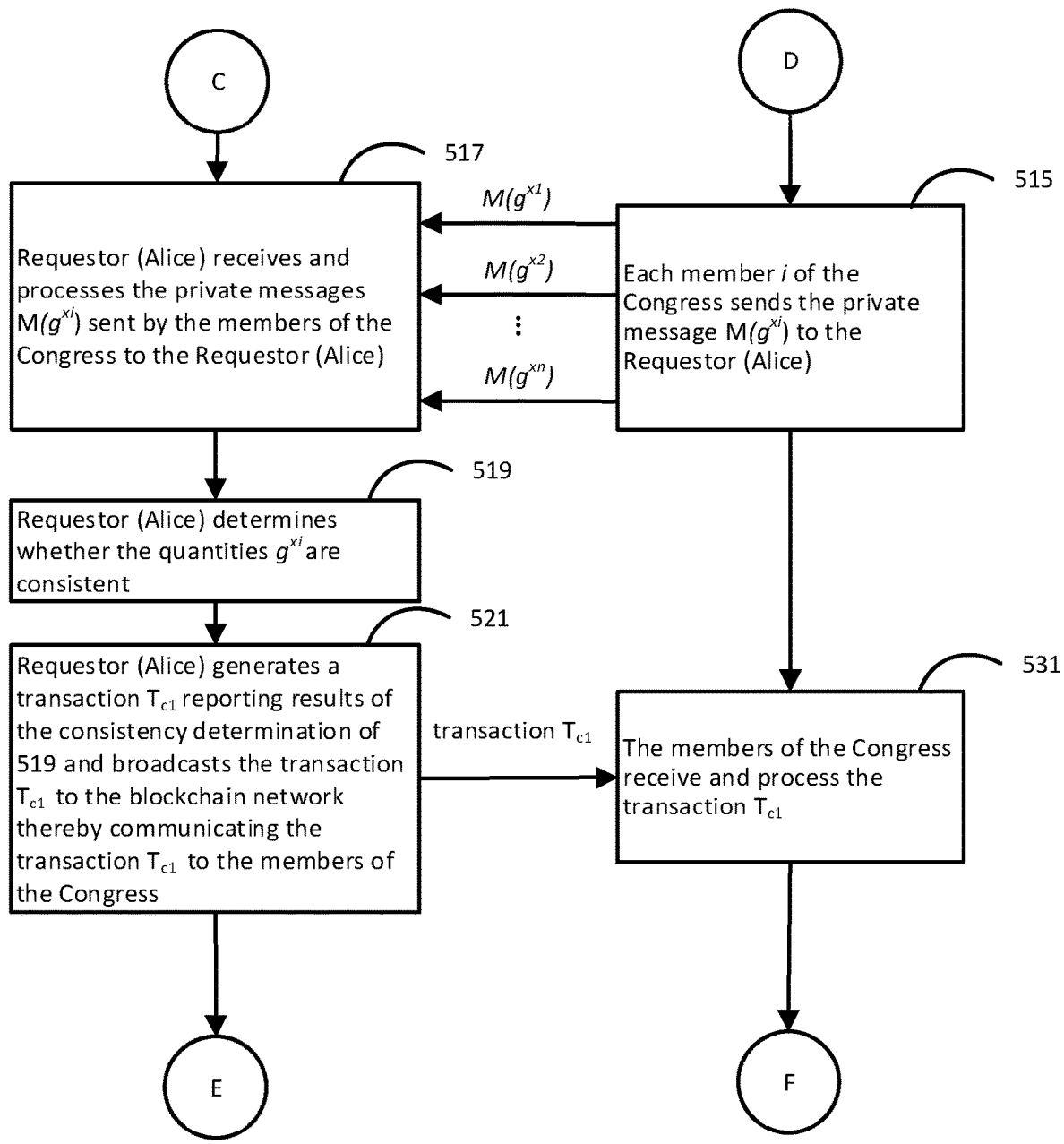
Figure 5D:
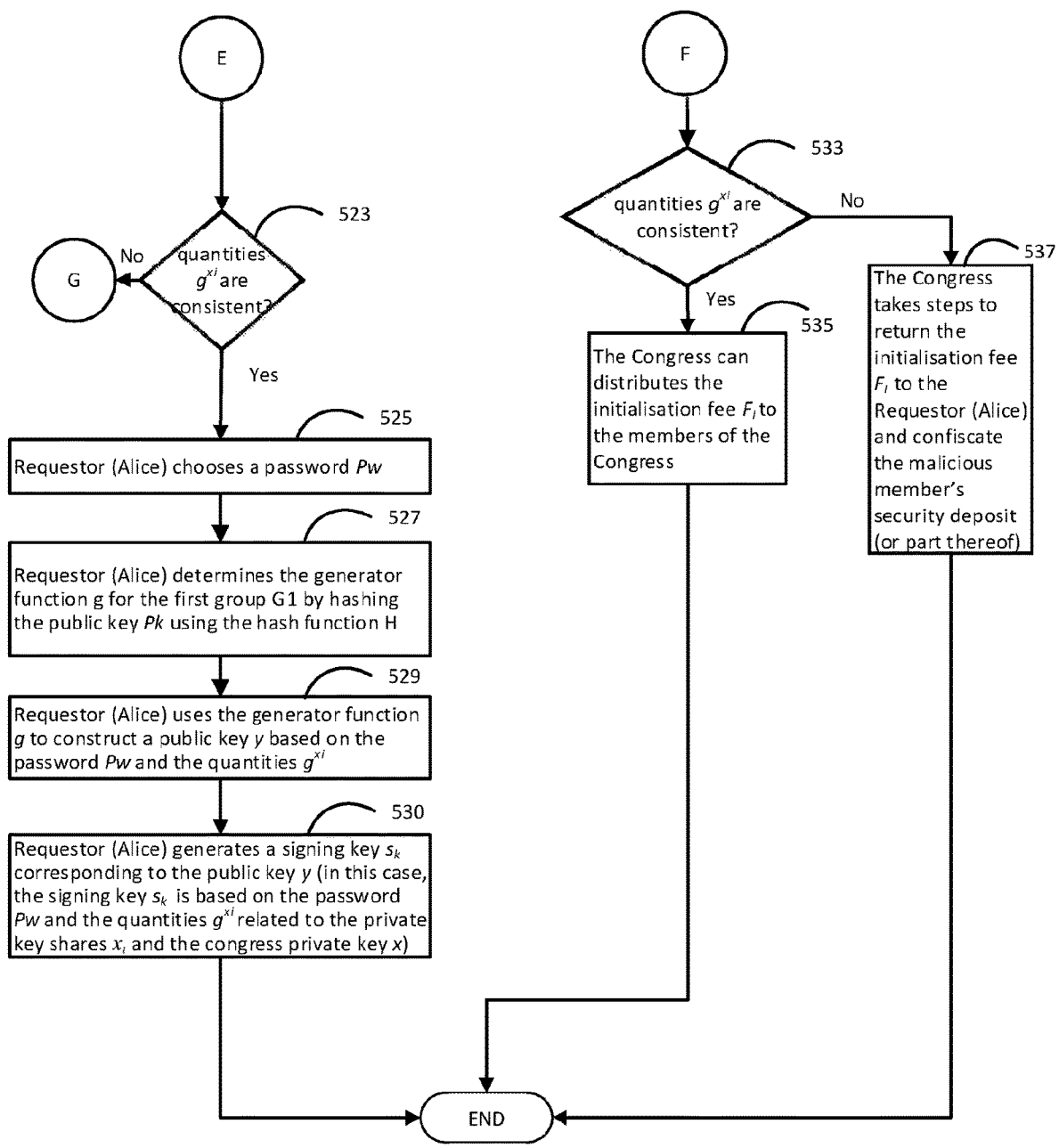

FIG. 4 illustrates details of the phase 301 that establishes the congress 110.

At operation 401, the nodes 102 that will participate as members of the congress are identified, thus establishing the congress 110. Techniques for establishing and maintaining the congress 110 are described in GB Patent Appl. No. 1705867.8, filed on 11 Apr. 2017, and GB Patent Appl. No. GB1705869.4, filed on 11 Apr. 2017.

At operation 403, the congress 110 determines parameters for the digital signature scheme that employ bilinear mappings on an elliptic curve (e.g., first group G1, second group G2, mapping function e, and hash function H).

At operation 405, the members of the congress 110 use a distributed protocol whereby the TEE for each member i of the congress determines and holds its private key share $x_i$ in the congress private key x. In this embodiment, $x \in_R Z_q^*$ according to the bilinearity condition of the bilinear mapping of the digital signature scheme. The distributed protocol also determines the congress public key (CPK) that corresponds to the congress private key x.

FIGS. 5A-5D illustrates details of the initialisation phase 303.

At operation 501, the requestor (Alice) generates an initialisation transaction $T_I$. It is assumed that the requestor (Alice) has an account with a public key Pk. The initialisation transaction $T_I$ indicates or signals to the congress 110 a desire to set a password that is associated with the requestor (Alice). The initialisation transaction $T_I$ specifies an initialisation fee $F_I$ that is transferred from the requestor's account with a public key Pk and paid to CPK. In embodiments, the initialisation transaction $T_I$ can specify that the initialisation fee $F_I$ is locked by the congress public key CPK, and may therefore be spent by a transaction signed with a signature based on the corresponding congress private key x. Note that the initialisation fee $F_I$ will be transferred to congress 110 in return for processing the initialisation transaction $T_I$ and thus participating in the initialisation phase 303. In embodiments, the initialisation transaction $T_I$ can include one or more transaction inputs that specify UTXO of the requestor's account and an associated unlocking script (e.g., scriptSig) that unlocks the UTXO as well as a transaction output that specifies a value equal to the initialisation fee $F_I$ with an associated locking script (e.g., scriptPubKey) that locks the initialisation fee $F_I$ with the congress public key CPK, and may therefore be spent by a spending transaction having a transaction input with an unlocking script (e.g., scriptSig) that provides the congress public key CPK and a signature based on the corresponding congress private key x. The initialisation transaction $T_I$ can possibly include another transaction output for change returned to the requestor's account, which represents the difference between the UTXO of the transaction input(s) and the initialisation fee $F_I$ less any implied transaction fee.

At operation 503, the requestor (Alice) broadcasts the initialisation transaction $T_I$ to the blockchain network 100 thereby communicating the initialisation transaction $T_I$ to the members of the congress 110. The operations of the requestor (Alice) then proceeds to operation 517.

At operation 505, nodes of the blockchain network 110 (which includes the members of the congress 110 and possibly other non-member nodes) validate the initialisation transaction $T_I$, and a mining node of the blockchain network 100 (which need not be a member of the congress 110) can mine the validated initialisation transaction $T_I$ for storage in the blockchain of the blockchain network 100, which confirms the transfer of the initialisation fee $F_I$ to the CPK of the congress 110. Note that the initialisation transaction $T_I$ can be required to satisfy the requisite conditions of all mined transactions (for example, one such condition is that the initialisation transaction $T_I$ offers a sufficient transaction fee to miners).

At operation 507, each member i of the congress 110 receives and processes the initialisation transaction $T_I$.

At operation 509, the TEE for each member i of the congress 110 determines the generator function g for the first group G1 by hashing the public key Pk belonging to the requestor (Alice) using the hash function H. In embodiments, the generator function g can be unique for the requestor (Alice) with overwhelming probability.

At operation 511, the TEE for each member i of the congress 110 uses the generator function g as determined in 509 to generate a quantity $g^{xi}$ based on its private key share $x_i$. In embodiments, the quantity $g^{xi}$ can be obtained via a repeated application of the group G1 where the operation depends on the group—additive or multiplicative—and will correspond to a sum or exponentiation. In embodiments, the quantity $g^{xi}$ can be obtained from repeated application of the group $G_1 \ni g:=(Pk)$ with the repeated application of the group shown simply as exponentiation.

At operation 513, the TEE of each member i of the congress 110 generates a private message $M(g^{xi})$ to the requestor (Alice). The private message $M(g^{xi})$ includes the quantity $g^{xi}$ which can be encrypted with the public key Pk belonging to the requestor (Alice). In embodiments, the private message $M(g^{xi})$ can be associated with the public key associated with the TEE of the member i and can be signed with the corresponding private key of the TEE of the member i. Note that the private messages $M(g^{xi})$ can include certain blinded quantities that do not reveal the private key shares $x_i$ of the congress to the requestor (Alice), but allow the requestor (Alice) to verify the consistency of the quantities $g^{xi}$, which can be based on the techniques described in Ibrahim et al., "A robust threshold elliptic curve digital signature providing a new verifiable secret sharing scheme", 2003 EIII 46th Midwest Symposium on Circuits and Systems, 1:276-280 (2003).

At operation 515, each member i of the congress 110 sends the private message $M(g^{xi})$ to the requestor (Alice) and the operations of the members of the congress 110 proceed to 531.

At operation 517, the requestor (Alice) receives and processes the private messages $M(g^{xi})$ sent by the members of the congress 110 to the requestor (Alice). The authenticity of each private message $M(g^{xi})$ can be checked by verifying the signature of the private message $M(g^{xi})$ using the corresponding public key associated with the TEE of the member i.

At operation 519, the requestor (Alice) determines whether the quantities $g^{xi}$ are consistent. The consistency check of 323 can be carried out using any one of a number of well-known verifiable secret sharing schemes. See https://en.wikipedia.org/wiki/Verifiable_secret_sharing. The consistency check of 323 can also be carried out using a public verifiable secret sharing scheme as described in Stadler, M., "Publicly verifiable secret sharing," In *International Conference on the Theory and Applications of Cryptographic Techniques*, May 1996, pp. 190-199. These schemes can be used to (i) identify inconsistent shares (ii) check whether a quantity or share 'secretly sent' to a party differs from the blinded quantity or share which is broadcast, which can be based on the techniques described in Ibrahim et al. In order to carry out the consistency check, the quantities $g^{xi}$ can be decrypted using the private key belonging to the requestor (Alice) and corresponding to the public key Pk.

At operation 521, the requestor (Alice) generates a transaction $T_{c1}$ reporting results of the consistency determination of 323 and broadcasts the transaction $T_{c1}$ to the blockchain network 100 thereby communicating the transaction $T_{c1}$ to the members of the congress 110. In embodiment(s), the results of the transaction $T_{c1}$ can include a reference to any node that provided an inconsistent quantity $g^{xi}$ (such as the public key for the TEE of that node), or a null reference if all of the quantities $g^{xi}$ are consistent.

At operation 523, the requestor (Alice) evaluates the transaction $T_{c1}$ to check whether it indicates that the quantities $g^{xi}$ are consistent. If so, the operations of the requestor (Alice) continue to 525 to 529; otherwise the operations of the requestor (Alice) can return to 501 to generate and broadcast another initialisation transaction $T_I$.

At operation 525, the requestor (Alice) chooses or otherwise inputs a password Pw.

At operation 527, the requestor (Alice) determines the generator function g for the first group G1 by hashing the public key Pk using the hash function H.

At operation 529, the requestor (Alice) uses the generator function g to construct a public key y based on the password Pw and the quantities $g^{xi}$ and the operations of the requestor (Alice) in the initialisation phase ends. In embodiments, the public key y can be constructed as:

$$y = g^{Pw} \Pi_i (g^{xi})^{L_i} = g^{Pw+x}, \qquad (1)$$

where $L_i$ are the appropriate Lagrange coefficients.

Note that, despite Pw being low-entropy, public key y is unique with overwhelming probability since Pk is and hence g will be as well.

At operation 531, the members of the congress 110 receive and process the transaction $T_{c1}$.

At operation 533, each member i of the congress 110 evaluates the transaction $T_{c1}$ to check whether it indicates that the quantities $g^{xi}$ are consistent. If so, the operations continue to 535; otherwise the operations continue to 537.

At operation 535, the congress 110 can take steps to distribute the initialisation fee $F_I$ to the members of the congress 110 and the operations of the members of the congress 110 in the initialisation phase ends.

At operation 537, the congress 110 can take steps to return the initialisation fee $F_I$ to the requestor (Alice) (as the requestor is not at fault in this phase) and confiscate the security deposit for any malicious member node of the congress 110 that provided an inconsistent quantity $g^{xi}$ (as reported by the results of the transaction $T_{c1}$). In embodiments, the congress members can employ the proof-of-stake alternate chain (e.g., ghost chain) to confiscate the security deposit for any malicious member node of the congress 110. The confiscated security deposit can possibly be transferred to the other members of the congress 110 or burned by transferring the confiscated security deposit to an unspendable address. After 527, the operations of the members of the congress 110 in the initialisation phase can end.

FIG. 6 illustrates details of the funding phase 305.

At operation 601, the requestor (Alice) generates a funding transaction $T_F$, which specifies funds f of the requestor (Alice) where some or all of the funds f may be transferred using the password Pw. The funding transaction $T_F$ also specifies i) a transaction deposit fraction where the transaction deposit amount $D_T*f$ will need to be provided with any attempt to transfer some or all of the funds f using a password, ii) the generator function g, and iii) the public key y that locks the funds f.

In this embodiment, the funds f are locked (encumbered) by the public key y and may therefore be spent by one or more signed transactions (each of which is referred to the signed spending transaction, $T_S$) that contain, as meta data, a spending signature $\sigma_s$ which is generated from the password Pw and the quantities $\sigma_{s,i}$ sent from a threshold number of congress members in 735. In this embodiment, nodes of the to the blockchain network 100 (which can include members of the congress 110 and nodes that are not members of the congress 110) can operate to verify the spending signature $\sigma_s$ with the public key y (see operation 743 below) as part of validating the signed spending transaction $T_S$, which in effect releases the lock (encumbrance) involving the public key y on the funds f of the funding transaction $T_F$.

In embodiments, the funding transaction $T_F$ can include one or more transaction inputs that specify UTXO of the requestor's account and an associated unlocking script (e.g., scriptSig) that unlocks the UTXO as well as a transaction output that specifies a value equal to the funds f with an associated locking script (e.g., scriptPubKey) that locks the funds f with the public key y, and may therefore be spent by a spending transaction having a transaction input with an unlocking script (e.g., scriptSig) that provides the public key y and the spending signature $\sigma_s$ derived from the password Pw and the congress private key x. The funding transaction $T_F$ can also possibly include other transaction outputs (unspendable) that specify the transaction deposit fraction $D_T$ and the generator function g. The funding transaction $T_F$ can also possibly include another transaction output for change returned to the requestor's account, which represents the difference between the UTXO of the transaction input(s) and the the funds f less any implied transaction fee.

At operation 603, the requestor (Alice) broadcasts the funding transaction $T_F$ to the blockchain network 100.

At operation 605, nodes of the blockchain network 100 (which includes members of the congress 110 and possibly other non-member nodes) validate the funding transaction $T_F$, and a mining node of the blockchain network 100 (which need not be a member of the congress 110) can mine the validated funding transaction $T_F$ for storage in the blockchain of the blockchain network 100. Note that the funding transaction $T_F$ can be required to satisfy the requisite conditions of all mined transactions (for example, one such condition is that the funding transaction $T_F$ offers a sufficient transaction fee to miners).

FIGS. 7A-7D illustrate details of the payment authorization phase 307.

At operation 701, the requestor (Alice) generates an unsigned spending transaction $T_S$, which refers to the funds f locked by the funding transaction $T_F$. The unsigned spending transaction $T_S$ (when signed and broadcasted in 739 and 741 below) will transfer to a recipient some portion of the funds f.

In embodiments, the unsigned spending transaction $T_S$ can include a transaction input that refers to the funds f locked by the funding transaction $T_F$ of the requestor as well as a first transaction output that specifies a value equal to some portion of the funds f with an associated locking script (e.g., scriptPubKey) that locks this value based on the public key of the recipient, and may therefore be spent by a spending transaction having a transaction input with an unlocking script (e.g., scriptSig) that provides the recipient's public key and a signature based on the private key of the recipient.

At operation 703, the requestor (Alice) generates a pre-spending transaction $T_{PS}$ that transfers the transaction deposit amount $D_T*f$ locking it under the congress public key CPK. The pre-spending transaction $T_{PS}$ also includes a spending fee $F_s$, the hash of the corresponding unsigned spending transaction $T_S$ (i.e., $H(T_S)$) and a public key Pk'. The spending fee $F_s$, is a fee that the requestor (Alice) is willing to provide to the congress 110 for processing the pre-spending transaction $T_{PS}$ and the spending transaction $T_S$. The public key Pk' is an address of an account where the requestor wishes to move funds. This address may or may not be the same as the public key Pk used to transfer the deposit.

In embodiments, the pre-spending transaction $T_{PS}$ can include one or more transaction inputs that refer to UTXO of the requestor's account and an associated unlocking script (e.g., scriptSig) that unlocks the UTXO as well as a transaction output that specifies a value equal to the amount $(D_T*f)$ with an associated locking script (e.g., scriptPubKey) that locks the amount $(D_T*f)$ with the congress public key CPK, and may therefore be spent by a spending transaction having a transaction input with an unlocking script (e.g., scriptSig) that provides the congress public key CPK and a signature which is generated using the congress private key x. The pre-spending transaction $T_{PS}$ can possibly include other transaction outputs (unspendable) that specify the spending fee $F_s$, the hash of the corresponding unsigned spending transaction $T_S$ (i.e., $H(T_S)$) and the public key Pk'. The pre-spending transaction $T_{PS}$ can possibly include another transaction output for change returned to the requestor's account, which represents the difference between the UTXO of the transaction input(s) and the amount $(D_T*f)$ less any implied transaction fee.

At operation 705, the requestor (Alice) broadcasts the pre-spending transaction $T_{PS}$ to the blockchain network 100 thereby communicating the pre-spending transaction $T_{PS}$ to the members of the congress 110, and the operations of the requestor (Alice) proceeds to 723.

At operation 707, nodes of the blockchain network 100 (which includes members of the congress 110 and possibly other non-member nodes) validate the pre-spending transaction $T_{PS}$, and a mining node (which need not be a member of the congress 110) can mine the validated pre-spending transaction $T_{PS}$ for storage in the blockchain of the blockchain network 100, which confirms the transfer of the transaction deposit amount $D_T*f$. Note that the pre-spending transaction $T_{PS}$ can be required to satisfy the requisite conditions of all mined transactions (for example, one such condition is that the pre-spending transaction $T_{PS}$ offers a sufficient transaction fee to miners).

At operation 709, the members of the congress 110 receive and process the pre-spending transaction $T_{PS}$ to determine if the spending fee $F_s$ specified by the pre-spending transaction $T_{PS}$ is sufficient. The sufficiency of the spending fee $F_s$ can depend on the amount of computational work that is required to process the pre-spending transaction $T_{PS}$ (which includes the operations 709 to 749 as described below).

At operation 711, the members of the congress 110 evaluate the determination of sufficiency of the spending fee $F_s$. If the spending fee $F_s$, is determined to be insufficient, the operations continue to 713; otherwise (for the case where the spending fee $F_s$, is determined to be sufficient) the operations continue to 715-719.

In embodiments, the determination of sufficiency of the spending fee $F_s$, in 709 can involve a special unit of work that reflects the computational work of the operations carried out by the members of the congress, which is similar to "gas" in the Ethereum blockchain network. Each particular computational operation carried out by the members of congress 110 in processing the pre-spending transaction $T_{PS}$ is assigned a specific amount of this special unit in accordance with the computational resources required to execute that particular computation operation. The specific amounts of this special unit for all of the computational operation carried out by the members of congress 110 in processing the pre-spending transaction $T_{PS}$ are totaled together and multiplied by a price per special unit to determine a requisite threshold for the spending fee $F_s$. If the spending fee $F_s$, exceeds this threshold, the spending fee $F_s$, is deemed sufficient in 711. If the spending fee $F_s$, does not exceed this threshold, the spending fee $F_s$, is deemed insufficient in 711.

At operation 713, the congress 110 can take steps to bypass the further processing for the pre-spending transaction $T_{PS}$ (operations 715-719 and operations 729-733) as well as follow-on operations for the spending transaction $T_S$ (operations 741-749)

At operation 715, the TEE for each member i of the congress 110 uses its private key share x and the hash of the unsigned spending transaction $T_S$ (denoted $H(T_S)$) as included in the pre-spending transaction $T_{PS}$ to generate a corresponding quantity $\sigma_{s,i}$. In embodiment(s), the quantity a can be generated as $\sigma_{s,i}=H(T_s)^{x_i}$. Note that other members of the congress 110 do not know the spending transaction $T_S$ at this stage.

At operation 717, the TEE of each member i of the congress 110 generates a private message $M(\sigma_{s,i})$ to the requestor (Alice). The private message $M(\sigma_{s,i})$ includes the quantity $\sigma_{s,i}$ generated in 363 which can be encrypted with the public key Pk of the requestor (Alice). In embodiments, the private message $M(\sigma_{s,i})$ can be associated with the public key of the TEE of the member i and can be signed with the corresponding private key of the TEE of the member i. Note that the private messages $M(\sigma_{s,i})$ can include certain blinded quantities that do not reveal the private key shares $x_i$ of the congress to the requestor (Alice), but allow the requestor (Alice) to verify the consistency of the quantities $\sigma_{s,i}$ which can be based on the techniques described in Ibrahim et al., "A robust threshold elliptic curve digital signature providing a new verifiable secret sharing scheme", 2003 EIII 46th Midwest Symposium on Circuits and Systems, 1:276-280 (2003).

At operation 719, each member i of the congress 110 sends the private message $M(\sigma_{s,i})$ to the requestor (Alice), and the operations proceed to 729.

At operation 721, the requestor (Alice) receives and processes the private messages $M(\sigma_{s,i})$ sent by the members of the congress 110 to the requestor (Alice). The authenticity of each private message $M(\sigma_{s,i})$ can be checked by verifying the signature of the private message $M(\sigma_{s,i})$ using the corresponding public key associated with the TEE of the member i.

At operation 723, the requestor (Alice) determines whether the quantities $\sigma_{s,i}$ included in the received private messages $M(\sigma_{s,i})$ are consistent. The consistency check of 723 can be carried out using any one of the verifiable secret sharing schemes described above for 519. In order to carry out the consistency check, the quantities $\sigma_{s,i}$ can be decrypted using the private key belonging to the requestor (Alice) and corresponding to the public key Pk.

At operation 725, the requestor (Alice) generates a transaction $T_{c2}$ reporting results of the consistency determination of 723 and broadcasts the transaction $T_{c2}$ to the blockchain network 100 thereby communicating the transaction $T_{c2}$ to the members of the congress 110. In embodiment(s), the results of the transaction $T_{c2}$ can include a reference to any node that provided an inconsistent quantity a (such as the public key for the TEE of that node), or a null reference if all of the received quantities $\sigma_{s,i}$ are consistent.

At operation 727, the requestor (Alice) evaluates the transaction $T_{c2}$ to check whether it indicates that the quantities $\sigma_{s,i}$ are consistent. If so, the operations of the requestor (Alice) continue to 735-739; otherwise the operations of the requestor (Alice) can return to 701 to generate another unsigned spending transaction $T_S$ and follow-on processing.

At operation 729, the members of the congress 110 receive and process the transaction $T_{c2}$ to check whether it indicates that the received quantities $\sigma_{s,i}$ are consistent.

At operation 731, each member i of the congress 110 determines whether the processing of 729 indicates that the received quantities $\sigma_{s,i}$ are consistent. If so, the operations continue to 741; otherwise the operations continue to 733.

At operation 733, the congress 110 can take steps to transfer the transaction deposit amount $D_T^* f$ specified by the pre-spending transaction $T_{SP}$ and locked under the congress public key CPK to the public key Pk' specified by the requestor (as the requestor is not at fault in this phase) and confiscate the security deposit for any malicious member node of the congress 110 that provided an inconsistent quantity $\sigma_{s,i}$ (as reported by the results of the transaction $T_{c2}$) and then bypass follow-on operations for the spending transaction $T_S$. In embodiments, the congress members can employ the proof-of-stake alternate chain (e.g., ghost chain) to confiscate the security deposit for any malicious member node of the congress 110. The confiscated security deposit can possibly be transferred to the other members of the congress 110 or burned by transferring the confiscated security deposit to an unspendable address. After 733, the operations of the members of the congress 110 in the payment authorization phase can end.

At operation 735, the requestor (Alice) uses the hash of the unsigned spending transaction $T_S$ (i.e., $H(T_S)$), the password $P_w$ and the quantities $\sigma_{s,i}$ received from a threshold number of Congress members to generate a signing signature $\sigma_s$ The threshold number of Congress members can be determined in the initialisation phase when the private key shares $x_i$ are distributed to the congress members. In embodiment(s), the signing signature $\sigma_s$ can be generated as $\sigma_s = H(T_s)^{P_w} \Pi_i \sigma_{s,i}^{L_i} = H(T_s)^{P_w+x}$.

At operation 737, the requestor (Alice) includes the signature $\sigma_s$ generated in 735 as the signature for the spending transaction $T_S$ (which was initially generated in 701). In one example, the signature $\sigma_s$ can be included as part of the unlocking script (e.g., scriptSig) of the transaction input of the spending transaction $T_S$ where the transaction input refers to the funds f locked by the public key y.

At operation 739, the requestor (Alice) broadcasts the spending transaction $T_S$ (now signed with the signing signature $\sigma_s$) to the blockchain network 100.

At operation 741, nodes of the blockchain network (which includes members of the congress 110 and possibly other non-member nodes) validate the spending transaction $T_S$, which includes operations that verify the signature $\sigma_s$ of the spending transaction $T_S$ against the public key y of the corresponding funding transaction $T_F$. Such verification can use the mapping function e of the digital signature scheme and the generator function g specified in funding transaction $T_F$. For example, such verification can accept the signature $\sigma_s$ of the spending transaction $T_S$ if and only if $e(g, \sigma_s) = e(y, H(T_S))$. In embodiments, the operations that verify the signature $\sigma_s$ of the spending transaction $T_S$ against the public key y can be specified by the unlocking script (e.g., scriptSig) of the transaction input of the spending transaction $T_S$ (where the transaction input refers to the funds f locked by the funding transaction $T_F$ of the requestor) as well as the locking script (e.g., scriptPubKey) of corresponding transaction output of the referenced funding transaction $T_F$ of the requestor (which locks the funds f using the public key y).

At operation 743, the nodes of the blockchain network (which include members of the congress 110 and possibly other non-member nodes) evaluate the validation of the funding transaction $T_F$ performed in 741. If the validation of the funding transaction $T_F$ was successful (and thus the signature $\sigma_s$ of the spending transaction $T_S$ has been successfully verified against the public key y of the corresponding funding transaction $T_F$), the operations continue to 745 and 747. Otherwise (for the case where the validation of the funding transaction $T_F$ failed, possibly because the verification of signature $\sigma_s$ of the spending transaction $T_S$ against the public key y of the corresponding funding transaction $T_F$ failed), the operations continue to 749.

At operation 745, a mining node (which need not be a member of the congress 110) can mine the spending transaction $T_S$ for storage in the blockchain of the blockchain network 100, which confirms the transfer of the portion of funds f to the recipient of the spending transaction $T_S$.

At operation 747, the members of the congress 110 can take steps to transfer the amount $(D_T*f-F_s)$ as referred to in the pre-spending transaction $T_{SP}$ and locked by the congress public key CPK to the public key Pk' and transfer the spending fee $F_s$ to the members of the congress 110. This can involve the congress 110 generating a transaction with a first transaction input that refers to the transaction output of the pre-spending transaction $T_{SP}$ locked under the congress public key CPK with an unlocking script (e.g., scriptSig) that includes a congress-generated signature which releases the lock under the congress public key CPK and a first transaction output that transfers the amount $(D_T*f-F_s)$ to the public key Pk'. The transaction can also include a second transaction input that refers to the transaction output of the pre-spending transaction $T_{SP}$ locked under the congress public key CPK with an unlocking script (e.g., scriptSig) that includes the congress-generated signature which releases the lock under the congress public key CPK and a second transaction output that transfers $F_s$ to the CPK of the congress 110. The nodes of the blockchain network (which include members of the congress 110 and possibly non-member nodes) can validate this transaction, and a mining node (which need not be a member of the congress 110) can mine the validated transaction for storage in the blockchain of the blockchain network 100.

At operation 749, the spending transaction $T_S$ is deemed invalid, and the congress 110 can take steps to confiscate the transaction deposit amount $D_T*f$ referred to in the pre-spending transaction $T_{SP}$ and locked by the congress public key CPK and distribute the transaction deposit amount $D_T*f$ to the members of the congress 110. This can involve transactions that transfers shares in the transaction deposit amount $D_T*f$ to the members of the congress 110 where each transaction includes a transaction input that refers to the pre-spending transaction $T_{SP}$ whose output transfers the transaction deposit amount $D_T*f$ to the CPK of the congress 110. The transaction input also includes an unlocking script (e.g., scriptSig) that includes a congress-generated signature derived from the congress private key x (which utilises their private key shares $x_i$). This unlocking script releases the lock on the transaction deposit amount $D_T*f$ locked under the CPK in the previous transaction. The nodes of the blockchain network (which can include the members of the Congress and non-member nodes) can validate these transactions, and one or more mining nodes (which need not be a member of the Congress) can mine the validated transactions for storage in the blockchain of the blockchain network 100.

In an alternate embodiment, the funding transaction $T_F$ can specify that the funds f are locked by the congress public key CPK (instead of the public key y as described above) and can therefore be unlocked by a threshold of congress members who collaborate to sign a transaction using the congress private key x (by utilising their private key shares $x_1$). In this case, the signed spending transaction $T_S$ includes the public key y and the members of congress 110 operate to verify the signing signature $\sigma_s$ of the signed spending transaction $T_S$ using public key y. Thus, in this embodiment, only congress members need to verify the signature $\sigma_s$ of the signed spending transaction $T_S$ against the public key y (see 743' to 751'). If a threshold number of members of the congress 110 successfully verify the signing signature $\sigma_s$ of the signed spending transaction $T_S$ using the public key y, the members of congress collaborate to construct and sign a secondary spending transaction using the congress private key x (by utilising their private key shares $x_i$). The secondary spending transaction can be replicated from the spending transaction $T_S$ but has an unlocking script (e.g., scriptSig) for the transaction input that refers to the funds f locked by the funding transaction $T_F$ of the requestor where such unlocking script includes a congress-generated signature derived from the congress private key x. This unlocking script releases the lock on the funds f locked under the CPK in the funding transaction $T_F$. Also note that in this embodiment, the transaction deposit amount $D_T*f$ transferred by the pre-spending transaction $T_{PS}$ is locked under the CPK of the congress 110. In this embodiment, the operations of the spending phase can be modified as shown in FIGS. 8A and 8B.

At operation 735', the requestor (Alice) generates the signing signature $\sigma_s$ using the password $P_w$ and the quantities $\sigma_{s,i}$ received from a threshold number of Congress members. The threshold number of Congress members can be determined in the initialisation phase when the private key shares $x_i$ are distributed to the congress members.

In embodiment(s), the signing signature $\sigma_s$ can be generated as $\sigma_s = H(T_s)^{P_w} \Pi_i \sigma_{s,i}^{L_i} = H(T_s)^{P_w + x}$.

At operation 737', the requestor (Alice) includes the signature $\sigma_s$ as part of the spending transaction $T_S$ (which was initially generated in 701).

At operation 739', the requestor (Alice) broadcasts the spending transaction $T_S$ (which includes the signing signature $\sigma_s$) to the blockchain network 100, thereby communicating the spending transaction $T_S$ to the members of the congress 110.

At operation 741', the members of the congress 110 process the spending transaction $T_S$ to verify the signing signature $\sigma_s$ of the spending transaction $T_S$ using the public key y included in the spending transaction $T_S$. Such verification can use the generator function g included in the funding transaction $T_F$ and the mapping function e of the digital signature scheme. For example, such verification can accept the signing signature $\sigma_s$ of the spending transaction $T_S$ if and only if $e(g, \sigma) = e(y, H(T_S))$.

At operation 743', the members of the congress 110 alone evaluate the verification of the signing signature $\sigma_s$ of the spending transaction $T_S$ using the public key y performed in 741'. If the verification of signature $\sigma_s$ of the spending transaction $T_S$ fails, the operations continue to 745'. Otherwise (for the case where the verification of the signing signature $\sigma_s$ of the spending transaction $T_S$ is successful), the operations continue to 747' to 755'.

At operation 745', the spending transaction $T_S$ is deemed invalid, and the congress 110 can take steps to confiscate the transaction deposit amount $D_T*f$ specified by the pre-spending transaction $T_{SP}$ and locked under the congress public key CPK and distribute the transaction deposit amount $D_T*f$ to the members of the congress 110. This can involve transactions that transfer shares in the transaction deposit amount $D_T*f$ to the members of the congress 110 where each transaction includes a transaction input that refers to the transaction output of the pre-spending transaction $T_{SP}$ locked under the congress public key CPK. The transaction input also includes an unlocking script (e.g., scriptSig) that includes a congress-generated signature derived from the congress private key x (which utilises their private key shares $x_i$). This unlocking script releases the lock on the transaction deposit amount $D_T*f$ locked under the congress public key CPK in the pre-spending transaction $T_{SP}$. The nodes of the blockchain network (which can include the members of the Congress and non-member nodes) can validate these transactions, and one or more mining nodes (which need not be a member of the Congress) can mine the validated transactions for storage in the blockchain of the blockchain network 100.

At operation 747', a mining node (which need not be a member of the congress 110) can mine the spending transaction $T_S$ for storage in the blockchain of the blockchain network 100.

At operation 749', members of congress 110 (and no other non-member nodes) collaborate to generate a signature for the spending transaction $T_S$ using the congress private key x (which utilises their private key shares $x_i$).

At operation 751', members of the congress 110 (and no other non-member nodes) construct a secondary spending transaction by replicating the spending transaction $T_S$. The congress-generated signature of 749' is included in the secondary spending transaction to release the lock on the funds f under the CPK as specified in the funding transaction $T_F$.

At operation 753', nodes of the blockchain network (which includes members of the congress 110 and possibly non-member nodes) validate the secondary spending transaction, and a mining node (which need not be a member of the congress 110) can mine the validated secondary spending transaction for storage in the blockchain of the blockchain network 100.

At operation 755', members of the congress 110 can take steps to transfer the amount $(D_T*f - F_s)$ specified by the pre-spending transaction $T_{SP}$ and locked under the congress public key CPK to the public key Pk' and transfer the spending fee $F_s$, to the members of the congress 110. This can involve the congress 110 generating a transaction with a first transaction input that refers to the transaction output of the pre-spending transaction $T_{SP}$ locked under the congress public key CPK with an unlocking script (e.g., scriptSig) that includes the congress-generated signature of 749' (which releases the lock under the CPK) and a first transaction output that transfers the amount $(D_T*f - F_s)$ to the public key Pk'. The transaction can also include a second transaction input that refers to the transaction output of the pre-spending transaction $T_{SP}$ locked under the congress public key CPK with an unlocking script (e.g., scriptSig) that includes the congress-generated signature of 749' (which releases the lock under the CPK) and a second transaction output that transfers $F_s$, to the CPK of the congress 110. The nodes of the blockchain network (which include members of the congress 110 and possibly non-member nodes) can validate this transaction, and a mining node (which need not be a member of the congress 110) can mine the validated transaction for storage in the blockchain of the blockchain network 100.

Note that nodes of the blockchain network 100 that are not members of the congress 110 do not participate in verifying the spending signature $\sigma_s$ of the spending transaction $T_S$ using the public key y in 741' and 743'. This is different from operations 741 and 743 of the embodiment of FIGS. 7A-7D where members of the congress 110 as well as non-members nodes can participate in validating the spending transaction $T_S$.

Note that the embodiment of FIGS. 7A-7D can be efficient for large congresses, since it does not require the congress 110 generate a signature for the spending transaction $T_S$ using the congress private key x (which utilises their private key shares $x_i$) and validate this signature against CPK of the corresponding funding transaction $T_F$. However, the embodiment of FIGS. 8A-8B has the advantage that it could be implemented by a 'second layer' protocol. For example, it could be implemented on the Bitcoin blockchain network without the need to modify Bitcoin consensus rules.

The security of the improved digital signature scheme described herein is a function of the length of the password Pw and $D_T$. In the initialisation phase, choosing g:=H(Pk), where Pk in the public key of the account from which the fee $F_I$ is transferred, means that g will be unique to the requestor, since (we assume) only the requestor has the private key corresponding to Pk, which is necessary to authorise the transfer of the fee $F_I$.

Consider the following attack: An adversary would like to spend some funds f, without knowledge of the corresponding password Pw. The adversary would broadcast a pre-spending transaction $T_{ps}$, which transfers the required deposit $D_T*f$ to the congress public key CPK and specifies a public key Pk for which they hold the private key. The pre-spending transaction $T_{ps}$ also specifies $H(T_s)$, where $T_s$ spends the funds to themselves. The adversary will receive $\sigma_i = H(T_s)^{x_i}$ from the congress. However, since the adversary does not know the password Pw, it must construct a through repeated guessing of Pw. Each time the guess of Pw fails, the adversary loses $D_T*f$. Let us say that $D_T = \frac{1}{25}$, if the password Pw consists of a two-digit numeric 'PIN', then 50 trials, on average, are required to guess correctly, which requires the spending of 2f (twice the funds in the account). The attack is therefore not viable from an economic point of view.

In other embodiments, the requestor may specify other options for transferring the digital assets locked by the funding transaction, such as by the 'regular method' of signing with a private key s held by the requestor. In this case, the requestor may prefer to transact using the regular method, since it would be cheaper than using a password (because it would not require any fee to be paid to the congress). In this scenario, the transaction processing for the pre-spending transaction and spending transaction based upon the requestor chosen password might only be used if the requestor loses the private key s.

In yet other embodiments, one or more transactions as described herein can be mined for storage on the blockchain irrespective of whether or not verification of the respective signatures of the transactions is successful.

While the examples described above have referred to certain proof-of-work blockchain networks (such as the Bitcoin blockchain network), the methods described herein may also be used with other types of proof-of-work blockchain networks and possibly other proof-of-stake blockchain networks.

The methods described above have been generally described as being performed at a node, but features of the method rely on cooperation with other nodes and could be performed elsewhere.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A blockchain-implemented security method involving a requestor and a group of nodes, the blockchain-implemented security method comprising:
    establishing the group of nodes operably coupled to one another via at least one communication network, wherein each node of the group transfers a digital asset to the group, and wherein each node of the group stores a corresponding private key share;
    broadcasting, by a requestor system, an initialisation transaction from the requestor for communication to the group, wherein the initialisation transaction indicates a desire to set a password associated with the requestor;
    generating, by the nodes of the group, a plurality of first quantities in response to the initialisation transaction, wherein a first quantity generated by a first node is based at least in part on a first private key share of the first node and a generator function of a digital signature scheme employing a bilinear mapping on an elliptic curve;
    sending, by the nodes of the group, respective first messages to the requestor, wherein the respective first messages include the plurality of first quantities;
    generating, by the requestor system, a cryptographic key based on a password chosen by the requestor and the plurality of first quantities;
    broadcasting, by the requestor system, a funding transaction from the requestor for communication to the group, wherein the funding transaction specifies one or more digital assets of the requestor, further wherein all or some of such digital assets are transferrable using the password chosen by the requestor and include the cryptographic key;
    broadcasting, by the requestor system, a pre-spending transaction from the requestor for communication to the group, wherein the pre-spending transaction is unsigned, transfers a transaction deposit, and includes a hash of the pre-spending transaction that transfers a portion of funds of the one or more digital assets of the requestor using a hash function of the digital signature scheme;
    generating, by the nodes of the group, a plurality of second quantities in response to the pre-spending transaction, wherein a second quantity generated by a second node is based at least in part on the hash of the pre-spending transaction as included in the pre-spending transaction and a second private key share of the second node;
    sending, by the nodes of the group, respective second messages to the requestor, wherein the respective second messages include the plurality of second quantities;
    generating, by the requestor system, a cryptographic signature based on the password chosen by the requestor and the plurality of second quantities, wherein the cryptographic signature corresponds to the cryptographic key of the requestor based on the bilinear mapping on the elliptic curve of the digital signature scheme;
    broadcasting, by the requestor system, a spending transaction from the requestor for communication to the group, wherein the spending transaction transfers the portion of funds of the one or more digital assets of the requestor, and wherein the spending transaction is based on an unsigned spending transaction and is signed with the cryptographic signature; and
    verifying, by at least the nodes of the group, the cryptographic signature of the spending transaction using the cryptographic key of the requestor in the funding transaction,
    wherein, based on the verification, the spending transaction is stored in the blockchain, confirming a transfer of the portion of funds of the requestor to a recipient of the spending transaction.

2. The blockchain-implemented security method according to claim 1, further comprising:
    receiving, by the nodes of the group, the funding transaction from the requestor; and
    receiving, by the nodes of the group, the spending transaction from the requestor.

3. The blockchain-implemented security method according to claim 2, further comprising:
    receiving, by the nodes of the group, the initialisation transaction from the requestor.

4. The blockchain-implemented security method according to claim 2, further comprising:
    receiving, by the nodes of the group, the pre-spending transaction from the requestor.

5. The blockchain-implemented security method according to claim 3, wherein:
the initialisation transaction includes an initialisation fee that is at least one of:
paid by the requestor to the group;
paid to a public group address associated with the group; and/or
returned to the requestor in the event that at least one node of the group sends an inconsistent first quantity to the requestor, wherein the inconsistent first quantity is determined using a verifiable secret sharing scheme.

6. The blockchain-implemented security method according to claim 4, wherein:
the pre-spending transaction further defines a spending fee; and/or
the transaction deposit is locked under a public group address associated with the group; and/or
the group selectively transfers the transaction deposit less the spending fee back to the requestor in the event that the verifying is successful; and/or
the group selectively confiscates the transaction deposit in the event that the verifying fails; and/or
the transaction deposit is returned to the requestor in the event that at least one node of the group of nodes sends an inconsistent second quantity to the requestor, wherein the inconsistent second quantity is determined using a verifiable secret sharing scheme; and/or
the spending fee is paid to a public group address associated with the group; and/or
the nodes of the group verify that the spending fee is sufficient, wherein sufficiency of the spending fee is based on computation resources required to process a third transaction and the spending transaction; and/or
the nodes of the group selectively bypass further processing of the pre-spending transaction in the event of failed verification of sufficiency of the spending fee; and/or
the group selectively distributes the spending fee to the group in the event of successful verification of the cryptographic signature of the spending transaction.

7. The blockchain-implemented security method according to claim 1.

8. The blockchain-implemented security method according to claim 2, wherein:
the funding transaction specifies that the one or more digital assets of the requestor are locked by the cryptographic key and thus can be spent by the cryptographic signature; and
the verifying of the cryptographic signature of the spending transaction is performed by the group and optionally by other nodes that do not belong to the group.

9. The blockchain-implemented security method according to claim 2, wherein:
the funding transaction specifies that the one or more digital assets of the requestor are locked by a public key of the group and thus can be spent by a signature based on a threshold number of private key shares of the group;
the verifying of the cryptographic signature of the spending transaction is performed only by the group; and
upon successful verification of the cryptographic signature of the spending transaction, the group cooperates to generate the signature based on the threshold number of private key shares of the group and to construct a secondary spending transaction that includes the signature.

10. The blockchain-implemented security method according to claim 2, wherein:
the plurality of first quantities are included in private messages sent from the nodes of the group to the requestor and/or are encrypted with a public key of the requestor; and/or
the nodes of the group each have a trusted execution environment that stores the corresponding private key share of the node; and/or
the trusted execution environment of the first node generates the first quantity based at least in part on the first private key share of the first node and the generator function of the digital signature scheme; and/or
the plurality of second quantities are included in private messages sent from the nodes of the group to the requestor and/or are encrypted with the public key of the requestor; and/or
the trusted execution environment of the second node generates the second quantity based at least in part on a hash of the unsigned spending transaction as included in the pre-spending transaction and a second private key share of the second node; and/or
a private message sent from a corresponding node of the group to the requestor is associated with the corresponding public key of the corresponding trusted execution environment of the corresponding node and is signed with a corresponding private key of the corresponding trusted execution environment of the corresponding node; and/or
one or more nodes mine the funding transaction and the spending transaction for storage in a proof-of-work blockchain.

11. A non-transitory computer readable storage medium comprising computer-executable instructions which, when executed, cause one or more processors of a requestor system and a group of nodes to:
establish the group of nodes operably coupled to one another via at least one communication network, wherein each node of the group transfers a digital asset to the group, and wherein each node of the group stores a corresponding private key share;
broadcast, by the requestor system, an initialisation transaction from a requestor for communication to the group, wherein the initialisation transaction indicates a desire to set a password associated with the requestor;
generate, by the nodes of the group, a plurality of first quantities in response to the initialisation transaction, wherein a first quantity generated by a first node is based at least in part on a first private key share of the first node and a generator function of a digital signature scheme employing a bilinear mapping on an elliptic curve;
send, by the nodes of the group, respective first messages to the requestor, wherein the respective first messages include the plurality of first quantities;
generate, by the requestor system, a cryptographic key based on a password chosen by the requestor and the plurality of first quantities;
broadcast, by the requestor system, a funding transaction from the requestor for communication to the group, wherein the funding transaction specifies one or more digital assets of the requestor, further wherein all or some of such digital assets are transferrable using the password chosen by the requestor and include the cryptographic key;
broadcast, by the requestor system, a pre-spending transaction from the requestor for communication to the group, wherein the pre-spending transaction is unsigned, transfers a transaction deposit, and includes a hash of the pre-spending transaction that transfers a portion of funds of the one or more digital assets of the requestor using a hash function of the digital signature scheme;

generate, by the nodes of the group, a plurality of second quantities in response to the pre-spending transaction, wherein a second quantity generated by a second node is based at least in part on the hash of the pre-spending transaction as included in the pre-spending transaction and a second private key share of the second node;

send, by the nodes of the group, respective second messages to the requestor, wherein the respective second messages include the plurality of second quantities;

generate, by the requestor system, a cryptographic signature based on the password chosen by the requestor and the plurality of second quantities, wherein the cryptographic signature corresponds to the cryptographic key of the requestor based on the bilinear mapping on the elliptic curve of the digital signature scheme;

broadcast, by the requestor system, a spending transaction from the requestor for communication to the group, wherein the spending transaction transfers the portion of funds of the one or more digital assets of the requestor, and wherein the spending transaction is based on an unsigned spending transaction and is signed with the cryptographic signature; and verify, by at least the nodes of the group, the cryptographic signature of the spending transaction using the cryptographic key of the requestor in the funding transaction, wherein, based on the verification, the spending transaction is stored in the blockchain, confirming a transfer of the portion of funds of the requestor to a recipient of the spending transaction.

12. The non-transitory computer readable storage medium according to claim 11, wherein the computer-executable instructions, when executed, further cause the one or more processors to:

receive, by the nodes of the group, the funding transaction from the requestor; and receive, by the nodes of the group, the spending transaction from the requestor.

13. The non-transitory computer readable storage medium according to claim 12, wherein the computer-executable instructions, when executed, further cause the one or more processors to:

receive, by the nodes of the group, the initialisation transaction from the requestor.

14. The non-transitory computer readable storage medium according to claim 12, wherein the computer-executable instructions, when executed, further cause the one or more processors to:

receive, by the nodes of the group, the pre-spending transaction from the requestor.

15. The non-transitory computer readable storage medium according to claim 11, wherein the hash of the pre-spending transaction is a hash of at least part of the spending transaction.

16. An electronic device comprising:
an interface device;
a processor coupled to the interface device; and
a memory coupled to the processor, the memory having stored thereon computer-executable instructions which, when executed by the processor, cause the electronic device of a requestor system or a group of nodes to:

establish the group of nodes operably coupled to one another via at least one communication network, wherein each node of the group transfers a digital asset to the group, and wherein each node of the group stores a corresponding private key share;

broadcast, by the requestor system, an initialisation transaction from a requestor for communication to the group, wherein the initialisation transaction indicates a desire to set a password associated with the requestor;

generate, by the nodes of the group, a plurality of first quantities in response to the initialisation transaction, wherein a first quantity generated by a first node is based at least in part on a first private key share of the first node and a generator function of a digital signature scheme employing a bilinear mapping on an elliptic curve;

send, by the nodes of the group, respective first messages to the requestor, wherein the respective first messages include the plurality of first quantities;

generate, by the requestor system, a cryptographic key based on a password chosen by the requestor and the plurality of first quantities;

broadcast, by the requestor system, a funding transaction from the requestor for communication to the group, wherein the funding transaction specifies one or more digital assets of the requestor, further wherein all or some of such digital assets are transferrable using the password chosen by the requestor and include the cryptographic key;

broadcast, by the requestor system, a pre-spending transaction from the requestor for communication to the group, wherein the pre-spending transaction is unsigned, transfers a transaction deposit, and includes a hash of the pre-spending transaction that transfers a portion of funds of the one or more digital assets of the requestor using a hash function of the digital signature scheme;

generate, by the nodes of the group, a plurality of second quantities in response to the pre-spending transaction, wherein a second quantity generated by a second node is based at least in part on the hash of the pre-spending transaction as included in the pre-spending transaction and a second private key share of the second node;

send, by the nodes of the group, respective second messages to the requestor, wherein the respective second messages include the plurality of second quantities;

generate, by the requestor system, a cryptographic signature based on the password chosen by the requestor and the plurality of second quantities, wherein the cryptographic signature corresponds to the cryptographic key of the requestor based on the bilinear mapping on the elliptic curve of the digital signature scheme;

broadcast, by the requestor system, a spending transaction from the requestor for communication to the group, wherein the spending transaction transfers the portion of funds of the one or more digital assets of the requestor, and wherein the spending transaction is based on an unsigned spending transaction and is signed with the cryptographic signature; and verify, by at least the nodes of the group, the cryptographic signature of the spending transaction using the cryptographic key of the requestor in the funding transaction, wherein, based on the verification, the spending transaction is stored in the blockchain, confirming a transfer of the portion of funds of the requestor to a recipient of the spending transaction.

17. The electronic device according to claim 16, wherein the computer-executable instructions, when executed by the processor, further cause the electronic device to:
receive, by the nodes of the group, the funding transaction from the requestor; and
receive, by the nodes of the group, the spending transaction from the requestor.

18. The electronic device according to claim 17, wherein the computer-executable instructions, when executed by the processor, further cause the electronic device to:
receive, by the nodes of the group, the initialisation transaction from the requestor.

19. The electronic device according to claim 17, wherein the computer-executable instructions, when executed by the processor, further cause the electronic device to:
receive, by the nodes of the group, the pre-spending transaction from the requestor.

20. The electronic device according to claim 16, wherein the hash of the pre-spending transaction is a hash of at least part of the spending transaction.

* * * * *